(12) United States Patent
Kawakami

(10) Patent No.: US 9,809,061 B2
(45) Date of Patent: *Nov. 7, 2017

(54) TIRE

(71) Applicant: BRIDGESTONE CORPORATION, Tokyo (JP)

(72) Inventor: Yuki Kawakami, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 145 days.

This patent is subject to a terminal disclaimer.

(21) Appl. No.: 14/409,290

(22) PCT Filed: Jul. 4, 2013

(86) PCT No.: PCT/JP2013/068343
§ 371 (c)(1),
(2) Date: Dec. 18, 2014

(87) PCT Pub. No.: WO2014/007317
PCT Pub. Date: Jan. 9, 2014

(65) Prior Publication Data
US 2015/0165827 A1    Jun. 18, 2015

(30) Foreign Application Priority Data
Jul. 4, 2012 (JP) ................. 2012-150928

(51) Int. Cl.
*B60C 11/13* (2006.01)
*B60C 11/03* (2006.01)
(Continued)

(52) U.S. Cl.
CPC .......... *B60C 11/0327* (2013.01); *B60C 11/01* (2013.01); *B60C 11/0306* (2013.01);
(Continued)

(58) Field of Classification Search
CPC ......... B60C 11/1353; B60C 2011/1361; B60C 11/1369; B60C 2200/06; B60C 2200/065;
(Continued)

(56) References Cited

U.S. PATENT DOCUMENTS 3,727,661 A * 4/1973 Hoke ................... B60C 11/032
152/209.22
8,006,730 B2    8/2011 Ohara
(Continued)

FOREIGN PATENT DOCUMENTS

CN    101186168 A    5/2008
CN    101585298 A    11/2009
(Continued)

OTHER PUBLICATIONS

Apr. 28, 2016 Office Action issued in Russian Patent Application No. 2015103512.
(Continued)

*Primary Examiner* — Eric Hug
(74) *Attorney, Agent, or Firm* — Oliff PLC

(57) ABSTRACT

A tire is provided with multiple projection parts in a groove bottom of a groove portion. The projection parts extend from one side wall to the other side wall opposed to the one side wall, the side walls forming the groove portion. The projection parts are arranged at predetermined intervals in the groove portion. A relationship of 0.75L≤P≤10L is satisfied where L denotes a length of the projection parts and P denotes the predetermined intervals. In addition, a relationship of TWf/cos θf≤0.9W is satisfied where W denotes a groove width of the groove, TWf denotes a width of the projection parts, and θf denotes an angle formed by an extending direction of the projection parts and a groove center line in a direction opposite to a rotation direction of the tire in a tread face view of the tire.

6 Claims, 15 Drawing Sheets

(51) Int. Cl.
*B60C 11/04* (2006.01)
*B60C 11/01* (2006.01)

(52) U.S. Cl.
CPC .......... *B60C 11/0309* (2013.01); *B60C 11/04* (2013.01); *B60C 11/1369* (2013.01); *B60C 11/1384* (2013.01); *B60C 2011/1361* (2013.01)

(58) Field of Classification Search
CPC ............. B60C 11/0309; B60C 11/0316; B60C 2011/0341; B60C 2011/0365; B60C 2011/0367; B60C 11/042; B60C 11/047
USPC ............. 152/209.18, 209.19, 209.22, DIG. 1
See application file for complete search history.

(56) References Cited

U.S. PATENT DOCUMENTS

| | | | | |
|---|---|---|---|---|
| 9,643,458 | B2* | 5/2017 | Ogane | B60C 11/1353 |
| 2004/0211502 | A1* | 10/2004 | Ono | B60C 11/00 |
| | | | | 152/209.19 |
| 2005/0126670 | A1* | 6/2005 | Godefroid | B60C 11/0309 |
| | | | | 152/209.22 |
| 2008/0121326 | A1 | 5/2008 | Ohara | |
| 2010/0038001 | A1* | 2/2010 | Yamaguchi | B60C 11/0309 |
| | | | | 152/153 |
| 2013/0061993 | A1* | 3/2013 | Mathonet | B60C 11/042 |
| | | | | 152/209.22 |
| 2013/0276947 | A1* | 10/2013 | Oogane | B60C 11/04 |
| | | | | 152/209.18 |
| 2015/0083306 | A1* | 3/2015 | Colby | B60C 11/1369 |
| | | | | 156/96 |

FOREIGN PATENT DOCUMENTS

| | | |
|---|---|---|
| JP | A-6-99705 | 4/1994 |
| JP | 2001-253211 A | 9/2001 |
| JP | 2004-262295 A | 9/2004 |
| JP | A-2005-170381 | 6/2005 |
| JP | 2008-87628 A | 4/2008 |
| JP | A-2009-160994 | 7/2009 |
| JP | A-2011-183994 | 9/2011 |
| SU | 718461 A1 | 2/1980 |
| WO | 2008/114668 A1 | 9/2008 |
| WO | 2011/145721 A1 | 11/2011 |
| WO | WO 2012/090917 * | 7/2012 |

OTHER PUBLICATIONS

May 19, 2015 Office Action issued in Japanese Patent Application No. 2014-116164.

Office Action issued in Japanese Patent Application No. 2012-150928 dated Nov. 12, 2013 (with translation).

Office Action issued in Japanese Patent Application No. 2012-150928 dated Mar. 4, 2014 (with translation).

International Search Report issued in International Patent Application No. PCT/JP2013/068343 dated Aug. 6, 2013.

* cited by examiner (a)

(b)

(c)

(a)

(b)

TIRE

TECHNICAL FIELD

The present invention relates to a tire designed to suppress a temperature rise during driving.

BACKGROUND ART

Heretofore, pneumatic tires (hereinafter referred to as tires) put on vehicles have been using various methods for suppressing a temperature rise in the tires during driving of the vehicles. Heavy-loading tires put on trucks, buses, and construction vehicles, in particular, are subjected to a remarkable temperature rise.

To address this, there has been known a tire provided with many fin-like projections on its side wall of the tire (see Patent literature 1, for example). With such a tire, the fin-like projections generate a turbulent flow in an air flow passing along the surface of the side wall section when the tire is rotated on a road, and the turbulent flows encourage heat dissipation from the tire. Thus, a temperature rise in the side wall section is suppressed.

CITATION LIST

Patent Literature

Patent Literature 1: Japanese Patent Application Publication No. 2009-160994 (pp. 4 and 5, FIG. 2)

The aforementioned conventional tire, however, has the following point to be improved. Specifically, use of the projections on the side wall section alone has a limitation on efficient suppression of a temperature rise in the tread section.

SUMMARY OF INVENTION

The present invention has been made in consideration of such circumstances, and has an object to provide a tire capable of effectively suppressing a temperature rise of a tread section during driving of a vehicle.

To attain the above-mentioned object, the present invention has following features. A tire according to the present invention is a tire (tire 1) including a tread section (tread section 5) with a groove portion (circumferential groove 50B) extending in a tire circumferential direction (tire circumferential direction tcd), wherein multiple projection parts (projection parts 500) are formed on a groove bottom (groove bottom 50B2) of the groove portion, the projection parts each extend from one side wall (side wall 50B1) to the other side wall (side wall 50B3) opposed to the one side wall, the side walls forming the groove portion, the projection parts are arranged at predetermined intervals in the groove portion, a relationship of $0.75L \leq P \leq 10L$ is satisfied in a tread face view, where L denotes a length of the projection parts along a groove center line (groove center line WL) passing the widthwise center of the groove, and P denotes the predetermined intervals. In addition a relationship of $TWf/\cos \theta f \leq 0.9W$ is satisfied in a tread face view where W denotes a groove width of the groove, TWf denotes a width of the projection parts in a direction orthogonal to an extending direction (extending direction x) of the projection parts, and $\theta f$ denotes an angle formed by the extending direction of the projection parts and the groove center line in a direction opposite to a rotation direction of the tire.

The present invention can provide a tire capable of effectively suppressing a temperature rise of the tread section during driving a vehicle.

DESCRIPTION OF EMBODIMENTS

An example of a tire according to the present invention will be described with reference to figures. The following describes (1) a structure outline of a tire 1, (2) a structure outline of an air supply mechanism, (3) a structure outline of a recess portion 300, (4) a structure outline of projection parts 500, (5) actions and effects, (6) comparative evaluation, and (7) other embodiments.

In the following description of the drawings, the same or similar reference signs denote the same or similar elements and portions. In addition, it should be noted that the drawings are schematic and ratios of dimensions and the like are different from actual ones. Therefore, specific dimensions and the like should be determined in consideration of the following description. Moreover, the drawings also include portions having different dimensional relationships and ratios from each other.

(1) Structure Outline of Tire 1

Figure 1:
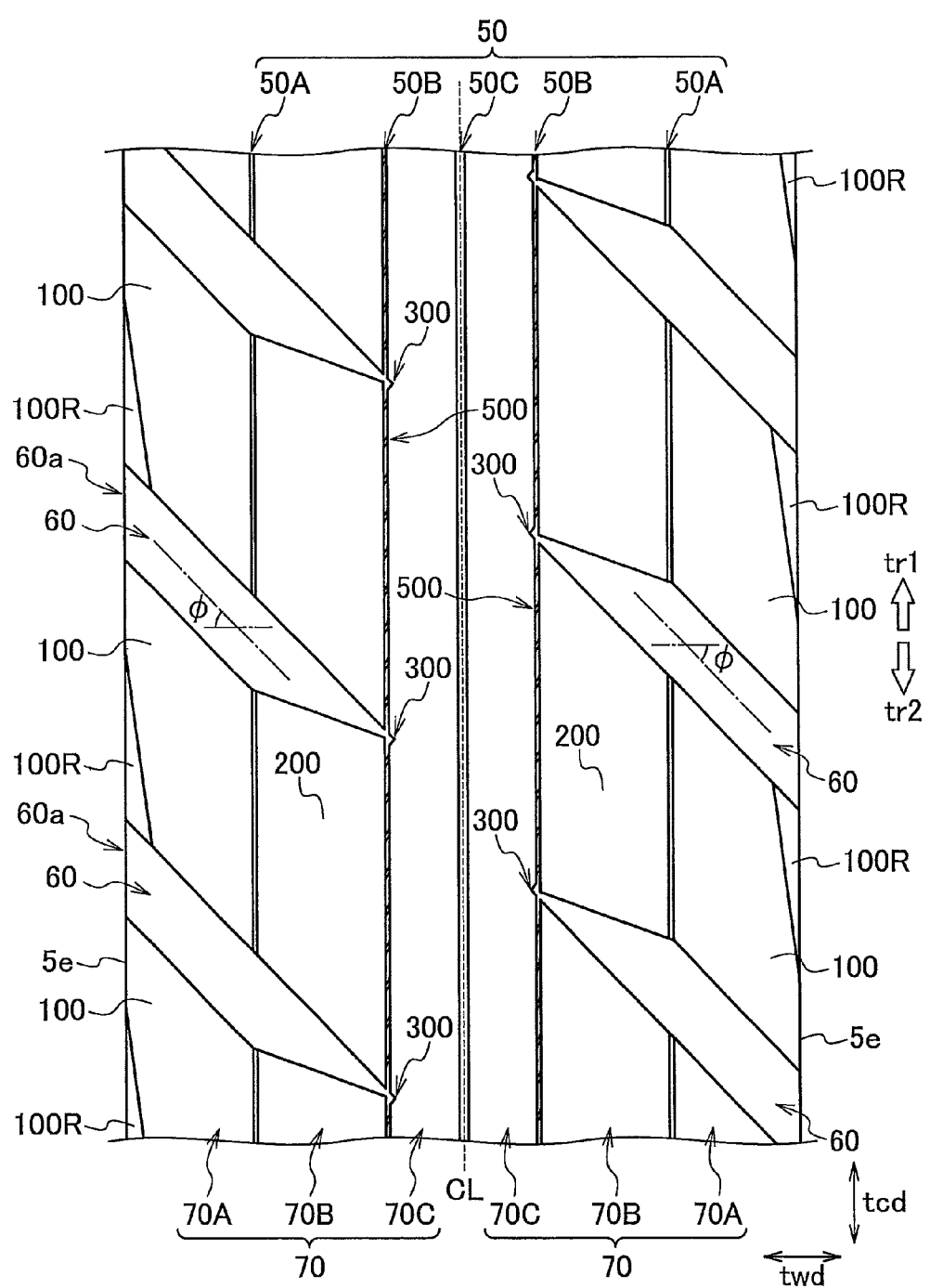
FIG. 1 is an exploded view illustrating a tread pattern of a tire 1 according to this embodiment.
Figure 2:
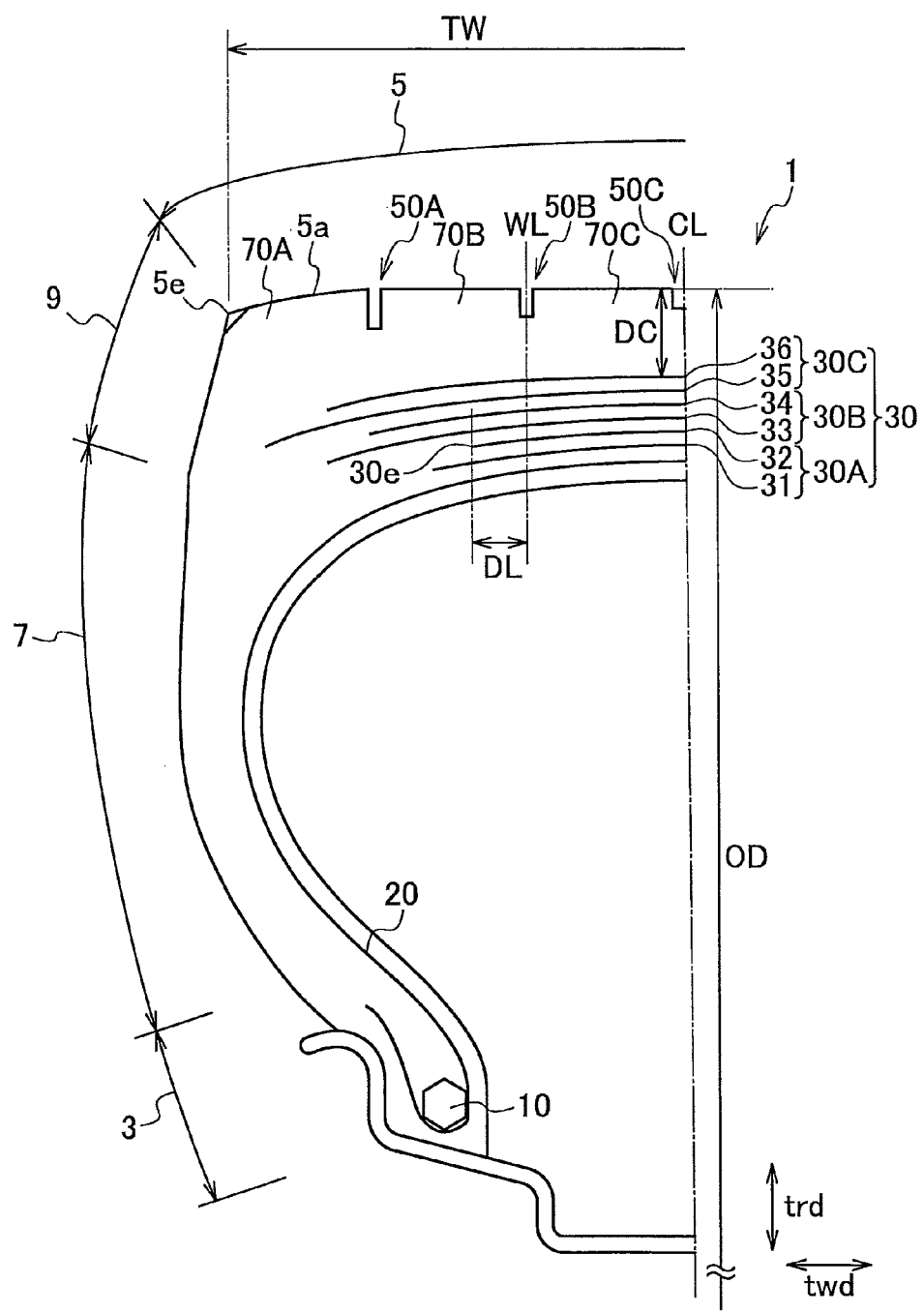
FIG. 2 is a sectional view illustrating the tire 1 according to this embodiment along a tire radial direction trd and a tread width direction twd.

The structure outline of the tire 1 according to this embodiment will be described with reference to FIGS. 1 and 2. FIG. 1 is an exploded view illustrating a tread pattern of the tire 1 according to this embodiment. FIG. 2 is a sectional view illustrating the tire 1 according to this embodiment taken along a tire radial direction trd and a tread width direction twd.

The tire 1 is assembled to a rim that is a normal rim. The tire 1 has a normal internal pressure, and is subjected to a normal load. The rim is provided with a rim flange. The rim flange supports bead sections 3 in the tread width direction twd.

For convenience of description, it is assumed that the tire 1 is put on a vehicle, and rolls in a rotation direction tr1 when the vehicle moves forward. The rotation direction of the tire 1 in a state put on the vehicle is not specifically limited.

The "normal rim" refers to a standard rim in an applicable size recited in Year Book 2008 published by JATMA (The Japan Automobile Tyre Manufacturers Association, Inc.). In countries other than Japan, the "normal rim" refers to standard rims in applicable sizes recited in the following standards.

The "normal internal pressure" refers to a pneumatic pressure defined by a tire measuring method (pp. 0-3, section 5) recited in Year Book 2008 published by JATMA (The Japan Automobile Tyre Manufacturers Association, Inc.). In countries other than Japan, the "normal internal pressure" refers to pneumatic pressures at measurement of the tire size, which are recited in the following standards.

The "normal load" refers to a load corresponding to a largest load capability in a single wheel recited in Year Book 2008 published by JATMA (The Japan Automobile Tyre Manufacturers Association, Inc.). In countries other than Japan, the "normal load" refers to largest loads (largest load capabilities) in single wheels in applicable sizes recited in the following standards.

The standards are determined by industrial standards effective in local areas where tires are manufactured or used. For example, the standard in United States is "Year Book of The Tire and Rim Association Inc.," and the standard in Europe is "Standards Manual of The European Tire and Rim Technical Organization".

As shown in FIGS. 1 and 2, the tire 1 includes the bead sections 3, a tread section 5, a side wall section 7, and a buttress section 9.

The bead section 3 has bead cores 10. The bead sections 3 are in contact with the rim.

The tread section 5 has a tread face 5a to come into contact with a road surface. The tread section 5 has a tread end 5e that is an outer end of the tread section 5 in the tread width direction twd. The tread pattern of the tread section 5 has a shape symmetric with respect to a point on a tire center line CL.

The side wall section 7 forms a side face of the tire 1. The side wall section 7 is located between the bead section 3 and the buttress section 9. The side wall section 7 connects the bead section 3 to the tread section 5 via the buttress section 9.

The buttress section 9 extends inward in the tire radial direction trd from the tread end 5e that is an outer end of the tread section 5 in the tread width direction twd. The buttress section 9 extends continuous to the side wall section 7. The buttress section 9 is located between the tread section 5 and the side wall section 7.

The inner position of the buttress section 9 in the tire radial direction trd corresponds to the innermost position of an opening area of the tread end 5e in below-mentioned lateral groove portion (lug grooves 60) in the tire radial direction trd. The buttress section 9 is out of contact with a road during normal driving.

As shown in FIG. 2, the tire 1 is a pneumatic tire. The tire 1 has a larger rubber gauge (rubber thickness) at the tread section 5 than pneumatic tires put on passenger cars and the like.

Specifically, the tire 1 satisfies a relationship of DC/OD≥0.015, where OD denotes the tire outer diameter, and DC denotes the rubber gauge of the tread section 5 at a position on the tire center line CL.

The tire outer diameter OD (unit: mm) is the largest outer diameter of the tire 1 (generally, at the tread section 5 near the tire center line CL). The rubber gauge DC (unit: mm) is the rubber thickness of the tread section 5 on the tire center line CL. The rubber gauge DC does not include the thickness of belt layers 30. As shown in FIG. 2, in the case where a circumferential groove 50C is formed in an area including the tire center line CL, the rubber gauge is the rubber thickness of the tread section 5 adjacent to the circumferential groove 50C.

As shown in FIG. 2, the tire 1 includes the pair of bead cores 10, a carcass layer 20, and the multiple belt layers 30.

The bead cores 10 are provided in the bead sections 3. The bead cores 10 each are formed of a bead wire (not shown).

The carcass layer 20 forms a frame for the tire 1. The carcass layer 20 spans the tread section 5 to the bead sections 3 through the buttress sections 9 and the side wall sections 7.

The carcass layer 20 straddles a space between the pair of bead cores 10, and is troidal-shaped. In this embodiment, the carcass layer 20 warps the bead cores 10. The carcass layer 20 is in contact with the bead cores 10. Both ends of the carcass layer 20 in the tread width direction twd are supported by the pair of bead sections 3.

The carcass layer 20 has a carcass cord extending in a predetermined direction in a tread face view. In this embodiment, the carcass cord extends in the tread width direction twd. An example of the carcass cord is a steel wire.

The belt layers 30 are disposed on the tread section 5. The belt layers 30 are located outside the carcass layer 20 in the tire radial direction trd. The belt layers 30 extend in a tire circumferential direction. The belt layers 30 have belt cords extending to be inclined to the predetermined direction which is an extending direction of the carcass cord. An exemplar belt used as the belt cord is a steel cord.

The multiple belt layers 30 include a first belt layer 31, a second belt layer 32, a third belt layer 33 a fourth belt layer 34 a fifth belt layer 35, and a sixth belt layer 36.

The first belt layer 31 is located outside the carcass layer 20 in the tire radial direction trd. The first belt layer 31 is located at the innermost position among the multiple belt layers 30 in the tire radial direction trd. The second belt layer 32 is located outside the first belt layer 31 in the tire radial direction trd. The third belt layer 33 is located outside the second belt layer 32 in the tire radial direction trd. The fourth belt layer 34 is located outside the third belt layer 33 in the tire radial direction trd. The fifth belt layer 35 is located outside the fourth belt layer 34 in the tire radial direction trd. The sixth belt layer 36 is located outside the fifth belt layer 35 in the tire radial direction trd. The sixth belt layer 36 is located at the outermost position among the multiple belt layers 30 in the tire radial direction trd. The first belt layer 31, the second belt layer 32, the third belt layer 33, the fourth belt layer 34, the fifth belt layer 35, and the sixth belt layer 36 are disposed from the inner side toward the outer side in the tire radial direction trd.

In this embodiment, widths of the first belt layer 31 and the second belt layer 32 each are 25% to 70%, both inclusive, of a width TW of the tread face 5a in the tread width direction twd. Widths of the third belt layer 33 and the fourth belt layer 34 each are 55% to 90%, both inclusive, of the width TW of the tread face 5a in the tread width direction twd. Widths of the fifth belt layer 35 and the sixth belt layer 36 each are 60% to 110%, both inclusive, of the width TW of the tread face 5a in the tread width direction twd.

In this embodiment, in the tread width direction twd, the width of the fifth belt layer 35 is larger than the width of the third belt layer 33, the width of the third belt layer 33 is equal to or larger than the width of the sixth belt layer 36, the width of the sixth belt layer 36 is larger than the width of the fourth belt layer 34, the width of the fourth belt layer 34 is larger than the width of the first belt layer 31 and the width of the first belt layer 31 is larger than the width of the second belt layer 32. In the tread width direction twd, the fifth belt layer 35 has the largest width, and the second belt layer 32 has the smallest width among the multiple belt layers 30. Accordingly, the multiple belt layers 30 include the shortest belt layer having the smallest length in the tread width direction twd (that is, the second belt layer 32).

The second belt layer 32 as the shortest belt layer has a belt end 30e that is an end in the tread width direction twd.

In this embodiment, inclined angles of the belt cords of the first belt layer 31 and the second belt layer 32 to the carcass cord in the tread face view each are 70 degrees to 85 degrees, both inclusive. Inclined angles of the belt cords of the third belt layer 33 and the fourth belt layer 34 to the carcass cord each are 50 degrees to 75 degrees, both inclusive. Inclined angles of the belt cords of the fifth belt layer 35 and the sixth belt layer 36 to the carcass cord each are 50 degrees to 70 degrees, both inclusive.

The multiple belt layers 30 include an inner crossing belt group 30A, an intermediate crossing belt group 30B, and an outer crossing belt group 30C.

The inner crossing belt group 30A consists of a pair of belt layers 30, and is located outside the carcass layer 20 in the tire radial direction trd. The inner crossing belt group 30A includes the first belt layer 31 and the second belt layer 32. The intermediate crossing belt group 30B consists of a pair of belt layers 30, and is located outside the inner crossing belt group 30A in the tire radial direction trd. The intermediate crossing belt group 30B includes the third belt layer 33 and the fourth belt layer 34. The outer crossing belt group 30C consists of a pair of belt layers 30, and is located outside the intermediate crossing belt group 30B in the tire radial direction trd. The outer crossing belt group 30C includes the fifth belt layer 35 and the sixth belt layer 36.

A width of the inner crossing belt group 30A is 25% to 70%, both inclusive, of the width of the tread face 5a in the tread width direction twd. A width of the intermediate crossing belt group 30B is 55% to 90%, both inclusive, of the width of the tread face 5a in the tread width direction twd. A width of the outer crossing belt group 30C is 60% to 110%, both inclusive, of the width of the tread face 5a in the tread width direction twd.

An inclined angle of the belt cord of the inner crossing belt group 30A to the carcass cord in the tread face view is 70 degrees to 85 degrees, both inclusive. An inclined angle of the belt cord of the intermediate crossing belt group 30B to the carcass cord in the tread face view is 50 degrees to 75 degrees, both inclusive. An inclined angle of the belt cord of the outer crossing belt group 30C to the carcass cord in the tread face view is 50 degrees to 70 degrees, both inclusive.

The inclined angle of the belt cord of the inner crossing belt group 30A to the carcass cord in the tread face view is the largest. The inclined angle of the belt cord of the intermediate crossing belt group 30B to the carcass cord is equal to or larger than that of the outer crossing belt group 30C.

As shown in FIGS. 1 and 2, the tread section 5 has multiple groove portions (circumferential grooves 50) and multiple lateral groove portions (lug grooves 60) that extend in a tire circumferential direction tcd. The tread section 5 also has multiple land portions (circumferential land portions 70) defined by the multiple circumferential grooves 50 and the multiple lug grooves 60.

The multiple circumferential grooves 50 extend in the tire circumferential direction tcd. The multiple circumferential grooves 50 include circumferential grooves 50A, 50B, and 50C.

The circumferential groove 50A is a circumferential groove located at the outermost position in the tread width direction twd. The circumferential groove 50C is located on the tire center line CL.

The circumferential groove 50B is located between the circumferential groove 50A and the circumferential groove 50C in the tread width direction twd. Specifically, the circumferential groove 50B is formed such that a length DL from the belt end 30e to a groove center line WL, which passes the widthwise center of the circumferential groove 50B in the tread face view of the tire, along the tread width direction twd is equal to or smaller than 200 mm.

As described below, a groove bottom 50B2 of the circumferential groove 50B has multiple projection parts 500. Thus, the temperature around the tread section 5 in which the circumferential groove 50 B is located decreases. Since the length DL from the belt end 30e to the groove center line WL in the tread width direction twd is equal to or smaller than 200 mm, the temperature of the belt end 30e decreases. Such temperature drop suppresses deterioration of the rubber member around the belt end 30e due to heat, and thereby inhibits generated heat from peeling the second belt layer 32 from the belt end 30e as a starting point and the surrounding rubber member. Since the second belt layer 32 as the shortest belt layer most susceptible to heat of the tread section 5 is inhibited from being peeled off, the durability of the tire 1 can be improved.

The tread section of the heavy-loading tire put on trucks, buses, and construction vehicles has a large rubber gauge (thickness) and a large rubber volume. When such heavy-loading tire is repeatedly deformed, the temperature of the tread section rises. In such heavy-loading tire, in particular, the tread section 5 located outer than the tread section 5 near the tire center line CL in the tread width direction twd generates more heat. Thus, by providing the multiple projection parts 500 on the groove bottom 50B2 of the circumferential groove 50B located outside the tire center line CL, heat can be effectively dissipated from the tread section 5.

The lug grooves 60 extend from the circumferential groove 50B to the buttress section 9. The lug grooves 60 have respective openings 60a in the buttress section 9. Accordingly, the lug grooves 60 are opened to the tread end 5e. The lug grooves 60 communicate with the circumferential groove 50A and the circumferential groove 50B. Inner ends of the lug grooves 60 in the tread width direction twd communicate with the circumferential groove 50B.

A width between both ends (tread ends 5e) of the tread section 5 in the tread width direction is expressed as TW. In this embodiment, both ends of the tread section 5 refer to both ends, in the tread width direction twd, of a contact range where the tire is in contact with the road surface. The state where the tire is in contact with the road surface means the state where the tire is attached to the normal rim, and receives the normal internal pressure and the normal load.

In the tread face view of the tire 1, the lug grooves 60 extend to be inclined to the tread width direction twd. An inclined angle φ of the lug grooves 60 to the tread width direction twd is 15 degrees to 60 degrees, both inclusive.

As shown in FIG. 1, when the tire 1 rotates in the rotation direction tr1, an air flow (relative wind) in the direction opposite to the rotation direction tr1 is generated in response to the rotation of the tire 1. The left lug grooves 60 in FIG. 1 move forward in the rotation direction tr1 as they are located outward in the tread width direction twd. The inclined angle φ of the lug grooves 60 to the tread width direction twd is 15 degrees to 60 degrees, both inclusive. For this reason, when the tire 1 rotates in the rotation direction tr1, an air flow entering the lug grooves 60 from the outside can be inhibited from hitting the side walls of the lug grooves 60 near the openings 60a and staying there. This can improve the thermal conductivity of the lug grooves 60, and smoothly guide the air flow to the circumferential groove 50B, and therefore lower the temperature of the tread section 5.

On the other side, when the tire 1 rotates in the rotation direction tr1, in the right side of the tread section 5 in FIG. 1, an air flow (relative wind) in the direction opposite to the rotation direction tr1 is generated in response to the rotation of the tire 1. Since the inclined angle φ of the lug grooves 60 to the tread width direction twd is 15 degrees to 60 degrees, both inclusive, air in the lug grooves 60 easily flows along the lug grooves 60. As a result, discharging of air to the outer side from the lug grooves 60 in the tread width direction twd can be promoted to increase the flow rate of the air flowing in the lug grooves 60. This can also improve the thermal conductivity of the lug grooves 60, lowering the temperature of the tread section 5.

Air flowing in the circumferential groove 50B more easily enters the lug grooves 60. Air that passes through the circumferential groove 50B and stores heat flows to the outside through the lug grooves 60, promoting dissipation of heat from the tread section 5.

The inclined angle φ of 60 degrees or less can ensure the stiffness of below-mentioned land blocks 100 and 200. This can suppress deformation of the land blocks 100 and 200 due to the rotation of the tire 1, and accordingly suppress an increase of the heating value of the tread section 5.

The multiple circumferential land portions 70 extend in the tire circumferential direction. The multiple circumferential land portions 70 include circumferential land portions 70A, 70B, and 70C.

The circumferential land portion 70A is a circumferential land portion located at the outermost position in the tread width direction twd. The circumferential land portion 70B is located between the circumferential land portion 70A and the circumferential land portion 70C in the tread width direction twd. The circumferential land portion 70C is a circumferential land portion located at the innermost position in the tread width direction twd.

The circumferential land portion 70A and the circumferential land portion 70B have the lug grooves 60. The tread section 5 is provided with land blocks 100 and 200 defined by the lug grooves 60. That is, the circumferential land portion 70A is divided by the lug grooves 60 to form the land block 100. The circumferential land portion 70B is divided by the lug grooves 60 to form the land block 200.

In this embodiment, the tire 1 is assumed as a radial tire having an oblateness of 80% or less, a rim diameter of 57" or more, a load capacity of 60 metric ton or more, and a load factor (k-factor) of 1.7 or more, for example. It should be noted that the tire 1 is not limited to this.

(2) Structure Outline of Air Supply Mechanism

Figure 3:
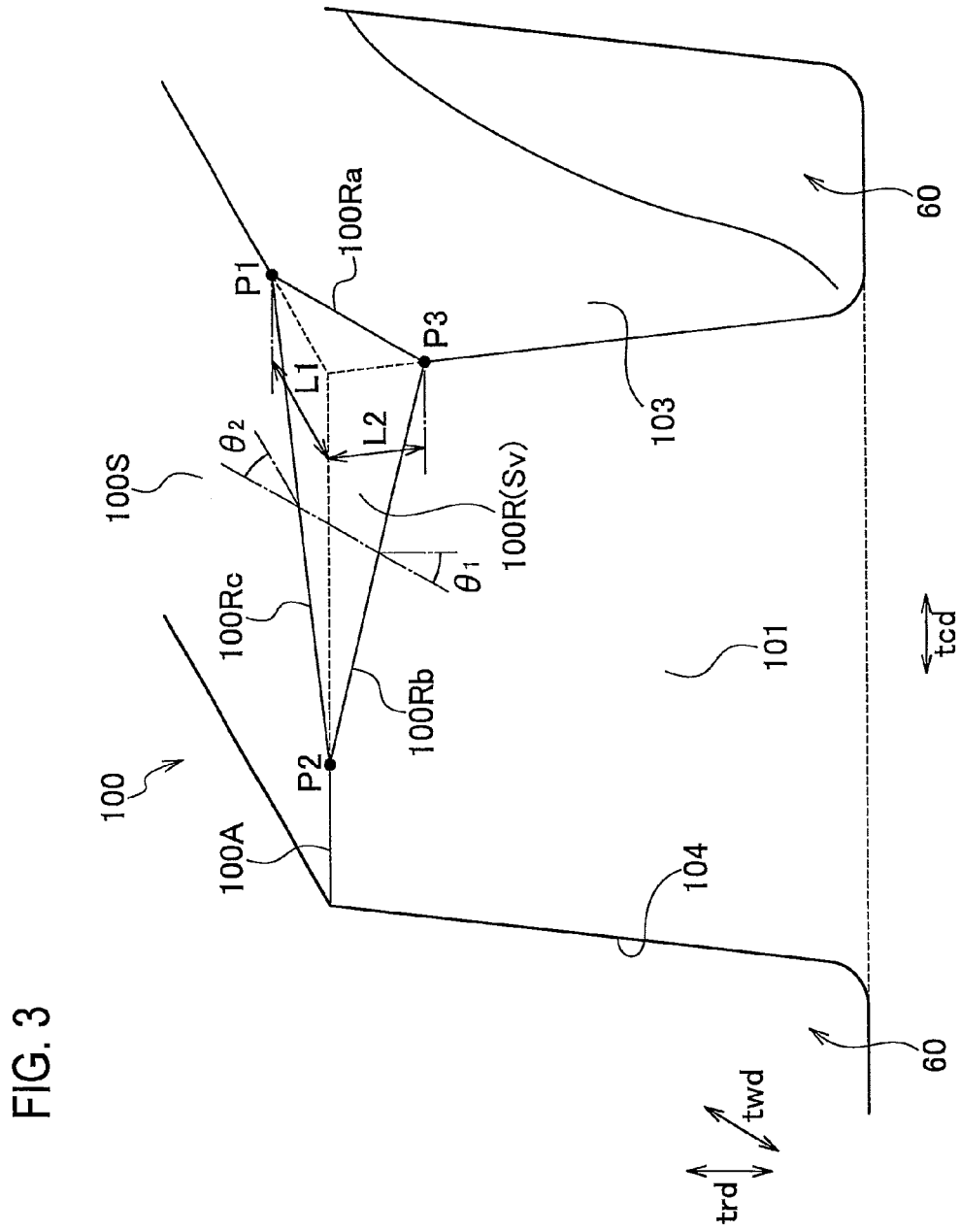
FIG. 3 is an enlarged perspective view illustrating a land block 100.
Figure 4:
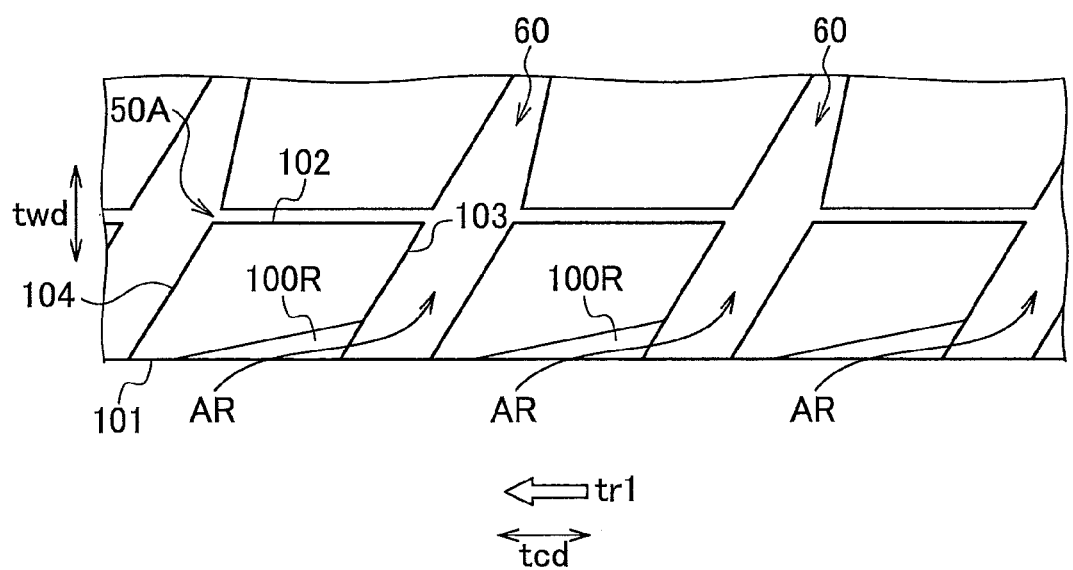
FIG. 4 is a plan view illustrating a circumferential land portion 70A in a tread face view.

Structure outline of the air supply mechanism according to this embodiment will be described with reference to FIG. 1 to FIG. 4. FIG. 3 is an enlarged perspective view of the land block 100. FIG. 4 is a plan view of the circumferential land portion 70A in the tread face view.

In the tire 1, the lateral groove portions (lug grooves 60) are provided with respective air supply mechanisms for air supply. In this embodiment, the air supply mechanisms each are formed of a tapered face 100R.

As shown in FIG. 1 to FIG. 4, the land block 100 has a tread face 100S that comes into contact with the road surface, a side face 101 formed outside the land block 100 in the tread width direction twd, a side face 102 formed inside the land block 100 in the tread width direction twd, a lateral groove face 103 that constitutes a groove wall of the lug groove 60 formed on one side of the land block 100 in the tire circumferential direction tcd, and a lateral groove face 104 that constitutes a groove wall of the lug groove 60 formed on the other side of the land block 100 in the tire circumferential direction tcd. The land block 100 has the tapered face 100R that crosses the tread face 100S, the side face 101, and the lateral groove face 103 at a corner portion 100A formed by the tread face 100S, the side face 101, and the lateral groove face 103. The corner portion 100A constitutes the above-mentioned tread end 5e of the tread section 5.

The side face 101 is formed in the land block 100 near the buttress section 9. The side face 101 extends in the tire circumferential direction tcd. The side face 101 is connected to the lateral groove faces 103 and 104 of the land block 100, which form the groove walls of the lug grooves 60. The side face 102 faces the side face 101 in the tread width direction twd. The side face 102 forms a groove wall of the circumferential groove 50A adjacent to the inner side of the land block 100 in the tread width direction twd.

The lateral groove face 103 extends in the tread width direction twd. The lateral groove face 103 is located on one side of the land block 100 in the tire circumferential direction tcd. The lateral groove face 104 extends in the tread width direction twd. The lateral groove face 104 is located on the other side of the land block 100 in the tire circumferential direction tcd.

Each tapered face 100R extends in the tire circumferential direction tcd at the corner portion 100A formed by the tread face 100S and the side face 101. The tapered face 100R is inclined inward in the tire radial direction trd in the cross section of the land block 100 in the tire circumferential direction tcd and the tire radial direction trd, as it gets closer to one side in the tire circumferential direction tcd. The tapered face 100R is also inclined inward in the tire radial direction trd in the cross section of the land block 100 in the tread width direction twd and the tire radial direction trd, as it gets closer to the outer side in the tread width direction twd.

That is, the tapered face 100R is chamfered at a vertex of the tread face 100S, the side face 101, and the lateral groove face 103. In other words, the tapered face 100R is formed to have at least one side on each of the tread face 100S, the side face 101, and the lateral groove face 103.

The tapered face 100R has one side on the side face 101, and does not have one side on the side face 102, out of the side face 101 and the side face 102 of the land block 100 in the tread width direction twd. That is, in the land block 100, one (side face 102) of the side face 101 and the side face 102, which are opposed to each other in the tread width direction twd, does not cross the tapered face 100R.

Further, the tapered face 100R has one side on the lateral groove face 103 and does not have one side on the lateral groove face 104, out of the lateral groove face 103 and the lateral groove face 104 of the land block 100 in the tire circumferential direction tcd. That is, one (lateral groove face 104) of the lateral groove face 103 and the lateral groove face 104, which are opposed to each other in the land block 100 in the tire circumferential direction tcd, does not cross the tapered face 100R.

Forming the tapered face 100R as described above facilitates air flowing along the tapered face 100R during rotation of the tire 1 to hit against the lateral groove face 104 of another land block 100 adjacent in the tire circumferential direction tcd. That is, air flowing along the tapered face 100R is easily taken into the lug groove 60 of the land block 100 adjacent in the tire circumferential direction tcd.

In this embodiment, the tapered face 100R is planar. That is, the tapered face 100R linearly extends on the cross section in the tire circumferential direction tcd and the tire radial direction trd, or the cross section in the tread width direction twd and the tire radial direction trd.

As shown in FIG. 3, in the case of a plane Sv passing a vertex P2 of the tapered face 100R, the tread face 100S, and the side face 101, a vertex P1 of the tapered face 100R, the tread face 100S, and the lateral groove face 103, and a vertex P3 of the tapered face 100R, the side face 101, and the lateral groove face 103, an angle θ2 that the plane Sv forms with the tread face 100S is larger than 0 degree and smaller than 45 degrees. Alternatively, an angle θ1 that the plane Sv forms with the side face 101 is larger than 0 degree and smaller than 45 degrees. That is, one of the angle θ1 or the angle θ2 only needs to be larger than 0 degree and smaller than 45 degrees. More preferably, the angle θ1 (or the angle θ2) is larger than 10 degrees and smaller than 30 degrees. In this embodiment, the tapered face 100R is planar and thus, the tapered face 100R is the same as the plane Sv.

Preferably, the tapered face 100R is formed such that a distance L2 between the vertex P1 and the vertex P3 in the tire radial direction trd is larger than a distance L1 between the vertex P1 and the vertex P2 in the tread width direction twd. The reason for this is as follows: since the distance L2 is larger than the distance L1 even when wear of the land block 100 occurs from the tread face 100S, the tapered face 100R tends to remain. That is, the effect of the tapered face 100R can last. More preferably, the distance L2 is 50 mm or more.

In the tire 1, the land block 100 has the tapered face 100R that crosses the tread face 100S, the side face 101 and the lateral groove face 103 at the corner portion 100A formed by the tread face 100S and the side face 101 located outside in the tread width direction twd.

Thus, as shown in FIG. 4, when the tire 1 rotates in the rotation direction tr1, an air flow (relative wind) AR generated by the rotation of the tire 1 flows along the tapered face 100R in the direction opposite to the rotation direction tr1. The air flow AR flowing along the tapered face 100R hits against the lateral groove face 104 of the land block 100 located behind in the rotation direction tr1, and is guided to the lug groove 60. As a result, the air flow AR from the side face 101 of the land block 100 to the lug groove 60 is formed. That is, air around the tire 1 is taken into the lug groove 60 to increase the flow rate of air flowing in the lug groove 60. This can improve the thermal conductivity of the lug grooves 60, lowering the temperature of the tread section 5.

When the tire 1 rotates in a rotation direction tr2 an air flow (relative wind) AR generated in the lug groove 60 due to the rotation of the tire 1 flows out along the tapered face 100R in the direction opposite to the rotation direction tr2. This promotes discharging of air to the outer side in the tread width direction twd through the lug groove 60 increasing the flow rate of air flowing in the lug groove 60. This can improve the thermal conductivity of the lug grooves 60, lowering the temperature of the tread section 5.

(3) Structure Outline of Recess Portion 300

Figure 5:
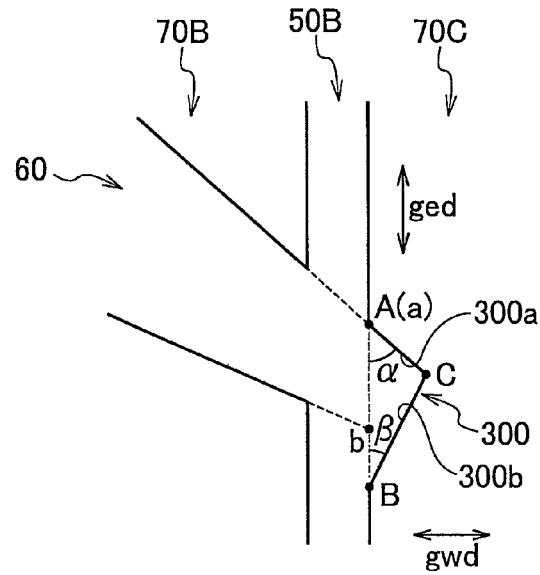
FIG. 5(a) to FIG. 5(c) are enlarged plan views illustrating a recess portion 300 in the tread face view.
Figure 5:
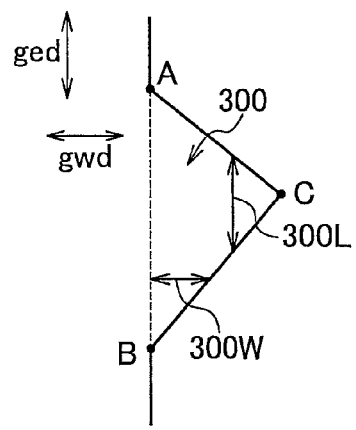
Figure 5:
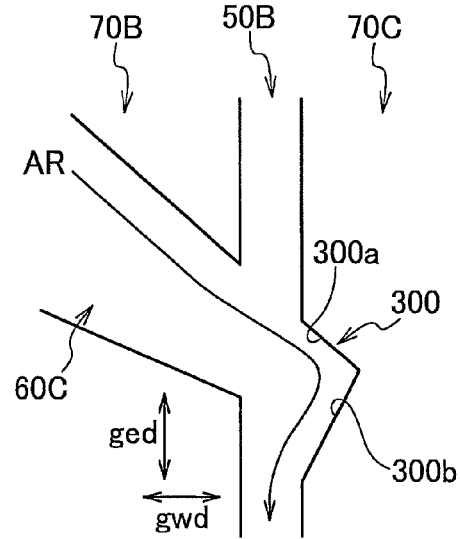

Structure outline of a recess portion 300 according to this embodiment will be described with reference to FIG. 5. FIG. 5(a) to FIG. 5(c) are enlarged plan views illustrating the recess portion 300 in the tread face view.

As shown in FIG. 5(a) to FIG. 5(c), the circumferential land portion 70C has the recess portion 300 The recess portion 300 is located in the extending direction of the lug groove 60. The recess portion 300 is formed in the groove wall face of the circumferential land portion 70C opposed to the lug groove 60.

In this embodiment, the recess portion 300 is triangular in the tread face view. In the tread face view, one wall face 300a of the recess portion 300 extends along an extension line of one wall face of the lug groove 60, and the other wall face 300b of the recess portion 300 crosses an extension line of the other wall face of the lug groove 60. In the tread face view, an intersection of the groove wall face of the circumferential land portion 70C opposed to the lug groove 60 with the extension line of the one wall face of the lug groove 60 is an intersection a, and an intersection of the groove wall face of the circumferential land portion 70C opposed to the lug groove 60 with the extension line of the other wall face of the lug groove 60 is an intersection b. In the tread face view, an end A of the wall face 300a near the circumferential groove 50B and the intersection a are located at the same position, and an end B of the wall face 300b near the circumferential groove 50B and the intersection b are located at different positions. The end B is not located between the intersection a and the intersection b. Accordingly, a length from the end A to the end B is larger than a length from the intersection a to the intersection b. In the tread face view, a contact point between the wall face 300a and the wall face 300b is a vertex C.

In the tread face view, an angle that the extension line along the groove wall face of the circumferential land portion 70C opposed to the lug groove 60 forms with the wall face 300a is an angle a, and an angle that extension line along the groove wall face of the circumferential land portion 70C opposed to the lug groove 60 forms with the wall face 300b is an angle β. In this embodiment, the angle β is smaller than the angle α. Preferably, α satisfies 20≤α≤70, and β satisfies β≤45 degrees.

The recess portion 300 is formed such that the center of the recess portion 300 on the extending direction of the circumferential groove 50B is displaced from the extending direction of the lug groove 60 and the rug groove center line passing the center in the direction orthogonal to the extending direction. The center of the recess portion 300 refers to at least one of the center of a line connecting the end A to the end B, and the vertex C.

As shown in FIG. 5(b), a length 300W of the recess portion 300 in the tread width direction twd varies along the tire circumferential direction tcd. That is, the length 300W gradually increases from the end B toward the vertex C in the tire circumferential direction tcd. The length 300W gradually decreases from the end C to a vertex A in the tire circumferential direction tcd.

A length 300L of the recess portion 300 in the tire circumferential direction tcd gradually decreases from the side opened to the circumferential groove 50B to the back. That is, the length 300L has a largest distance between the end A and the end B, and gradually decreases toward the vertex.

As shown in FIG. 5(c), by forming the recess portion 300, the air flow AR flowing through the lug groove 60 from the outer side to the inner side in the tread width direction twd hits against the wall face 300b of the recess portion 300. In FIG. 5(c), since the wall face 300a is located above the wall face 300b, the air flow AR is hard to flow above the wall face 300b. Thus, the air flow AR smoothly flows under guide of the circumferential groove 50B.

Since the recess portion 300 is formed to generate the air flow AR in one direction of the tire circumferential direction tcd, the air flow AR hardly stays in the circumferential groove 50B. This can improve the thermal conductivity of the circumferential groove 50B, lowering the temperature of the tread section 5.

(4) Structure Outline of Projection Parts 500

Structure outline of the projection parts 500 according to this embodiment will be described with reference to FIG. 6 to FIG. 9.

Figure 6:
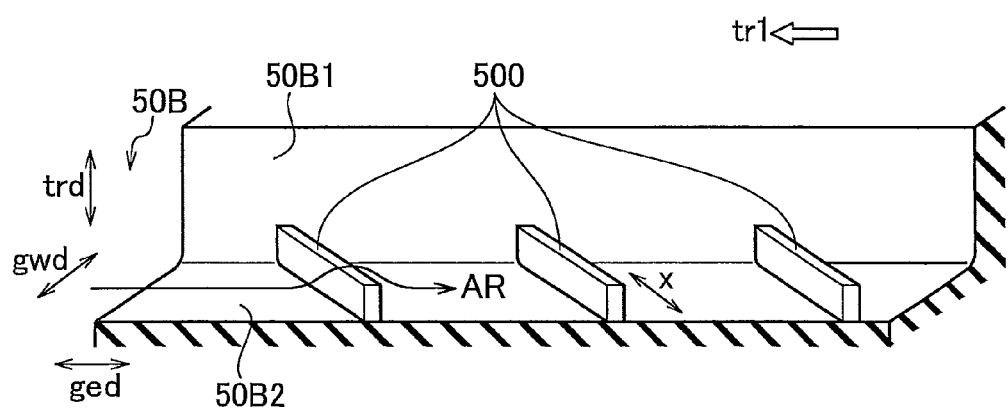
FIG. 6 is a partial cutaway perspective view illustrating a circumferential groove 50B.
Figure 7:
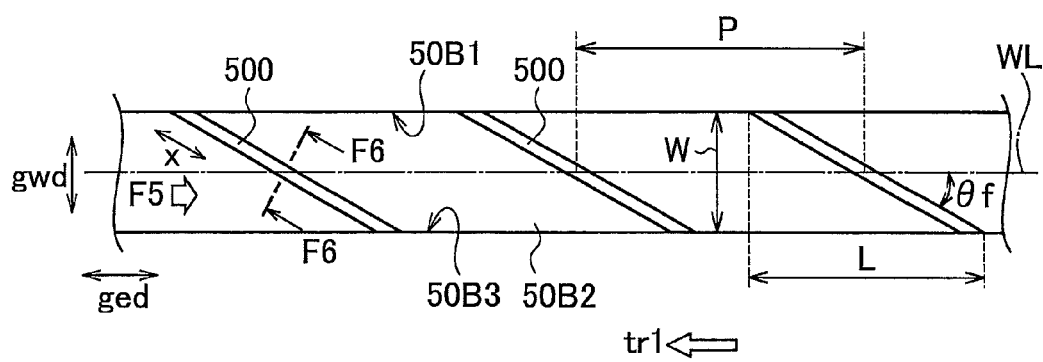
FIG. 7 is a view illustrating the shape of the circumferential groove 50B in the tread face view (when viewed from above the tread section 5).
Figure 8:
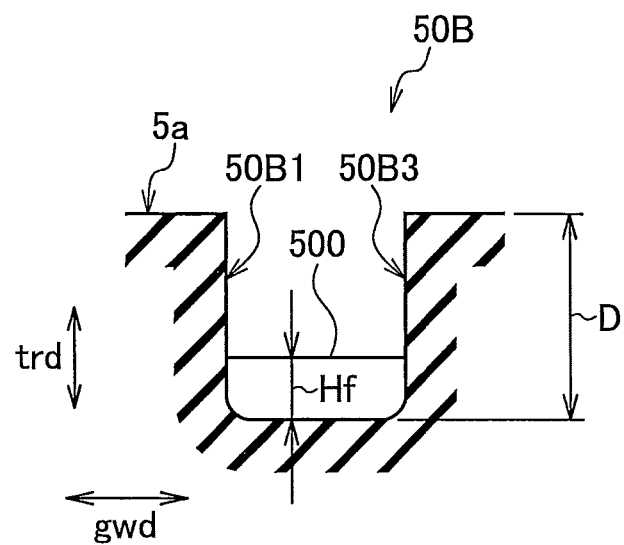
FIG. 8 is a view illustrating the shape of the circumferential groove 50B when viewed from a direction of F5 in FIG. 7.
Figure 9:
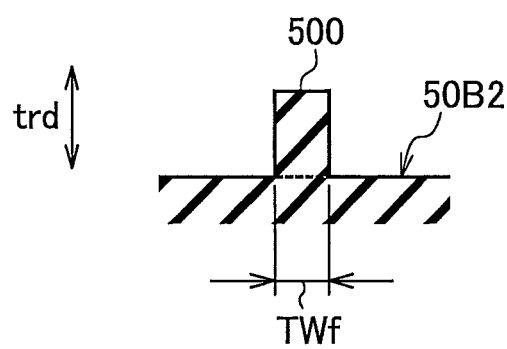
FIG. 9 is a sectional view illustrating the circumferential groove 50B (projection part 500) taken along a line F6-F6 in FIG. 7.

FIG. 6 is a partial cutaway perspective view illustrating the circumferential groove 50B. FIG. 7 shows the shape of the circumferential groove 50B in the tread face view (when viewed from above the tread section 5). FIG. 8 shows the shape of the circumferential groove 50B when viewed from a direction of F5 in FIG. 7. FIG. 9 is a sectional view illustrating the circumferential groove 50B (projection part 500) taken along a line F6-F6 in FIG. 7.

As shown in FIG. 6 to FIG. 9, the groove bottom 50B2 of the circumferential groove 50B is provided with the multiple projection parts 500.

In this embodiment, the projection parts 500 are disposed at predetermined intervals P in the circumferential groove 50B. The projection parts 500 extend from one side wall 50B1 to the other side wall 50B3 that fowl the circumferential groove 50B. In this embodiment, the projection parts 500 continuously extend from the one side wall 50B1 to the other side wall 50B3. That is, the projection parts 500 each are provided across a groove width W of the circumferential groove 50B. In this embodiment, the side wall 50B1 and the side wall 50B3 extend substantially parallel to the tire circumferential direction, and the side wall 50B1 and the side wall 50B3 are formed to be opposed to each other.

The projection parts 500 each are provided to erect outward in the tire radial direction from the groove bottom 50B2 of the circumferential groove 50B. In this embodiment, the projection parts 500 are flat plate-like rubbers erected from the groove bottom 50B2, and are inclined to the tire circumferential direction tcd.

Specifically, as shown in FIG. 7, an angle θf that the groove center line WL forms with the projection part 500 is 10 degrees to 60 degrees, both inclusive. The angle θf is an angle that the extending direction x of the projection parts 500 forms with the groove center line WL passing the center of the circumferential groove 50B in the width direction in the tread face view of the tire 1, and that is formed opposite to the rotation direction of the tire 1. That is, the angle θf is formed on the advancing side of the air flow AR generated by the rotation of the tire 1 in the rotation direction tr1.

Given that the length of the projection parts 500 along the groove center line WL is L and the predetermined intervals are P in the tread face view of the tire 1, the projection parts 500 provided on the circumferential groove 50B each satisfy a relationship of 0.75L≤P≤10L.

Since the projection parts 500 each satisfy the relationship of 0.75L≤P, the number of the projection parts 500 provided in the circumferential groove 50B does not become too large, which inhibits deceleration of air flowing in the circumferential groove 50B. Since the projection parts 500 each satisfy the relationship of P≤10L, the number of the projection parts 500 provided on circumferential groove 50B does not become too small, and the air flow AR1 efficiently changes to a spiral flow (swirling flow).

Preferably, a relationship of 1.25L<P is satisfied. More preferably, a relationship of 1.5L<P is satisfied, and still more preferably, a relationship of 2.0L<P is satisfied. Through satisfaction of these relations, the number of the projection parts 500 provided on circumferential groove 50B becomes more proper. The area of the groove bottom 50B2, through which the air flow AR passes, does not become too small, efficiently dissipating heat from the groove bottom 50B2.

A length L is a length from one end to the other end of the projection part 500 in an extending direction ged of the circumferential groove 50B (in this embodiment, tire circumferential direction). The interval P is a distance between centers of the projection parts 500 at which the projection parts 500 cross the groove center line WL.

Given that a distance between the side wall 50B1 to the side wall 50B3 of the circumferential groove 50B is the groove width W, the length L can be also expressed as W/tan θf+TWf/sin θf. As shown in FIG. 9, a projection width TWf is a width of the projection part 500 in the lateral direction of the projection part 500, that is, a width of the projection part 500 in the direction orthogonal to the extending direction x.

As shown in FIG. 8, given that a height of the projection part 500 from the groove bottom 50B2 is Hf, and a depth from the tread face 5a of the circumferential groove 50B to the groove bottom 50B2 (deepest section) is D, the projection part 500 satisfies a relationship of 0.03D<Hf≤0.4D. Given that the groove width of the circumferential groove 50B is W, the groove bottom 50B2 is flat at least in the case of the width of 0.2 W. That is, the central portion of the groove bottom 50B2 including the groove center line WL in the groove width W has no irregularity, and the surface of the groove bottom 50B2 is flat and smooth.

Given that the groove width of the circumferential groove 50B is W, and the width of the projection parts 500 in the direction orthogonal to the extending direction x of the projection parts 500 is TWf, a relationship of TWf/cos θf≤0.9W is satisfied.

Since the relationship of TWf/cos θf≤0.9W is satisfied, the projection width TWf does not become too large. Thus, the air flow AR1 after climbing over the projection parts 500 easily reaches the groove bottom 50B2 of the circumferential groove 50, thereby efficiently dissipating heat from the groove bottom 50B2.

Preferably, the projection parts 500 are provided so as to satisfy a relationship of 0.2≤TWf. Satisfying the relationship of 0.2≤TWf can ensure the projection width TWf to improve the durability of the projection parts 500. Since the projection parts 500 can be inhibited from being damaged during use of the tire 1 a temperature rise of the tread section 5 during driving of the vehicle can be efficiently suppressed.

For example, the length L is the range of 10 mm to 100 mm. For example, the interval P is 1.25 mm to 4.00 mm. For example, the projection height Hf is 5 mm to 15 mm. For example, the projection width TWf is 0.5 mm to 10 mm. For example, the depth D is 40 mm to 120 mm. For example, the groove width W of the groove bottom 50B2 is 5 mm to 20 mm.

(5) Actions and Effects

In the tire 1 the groove bottom 50B2 of the circumferential groove 50B is provided with the multiple projection parts 500, the projection parts 500 extend from the one side wall 50B1 to the other side wall 50B3 opposed to the one side wall 50B1, the side walls forming the circumferential groove 50B, the projection part 500 are provided at predetermined intervals on the circumferential groove 50B, and satisfy the relationship of 0.75L≤P≤10L and the relationship of TWf/cos θf≤0.9W.

Figure 10:
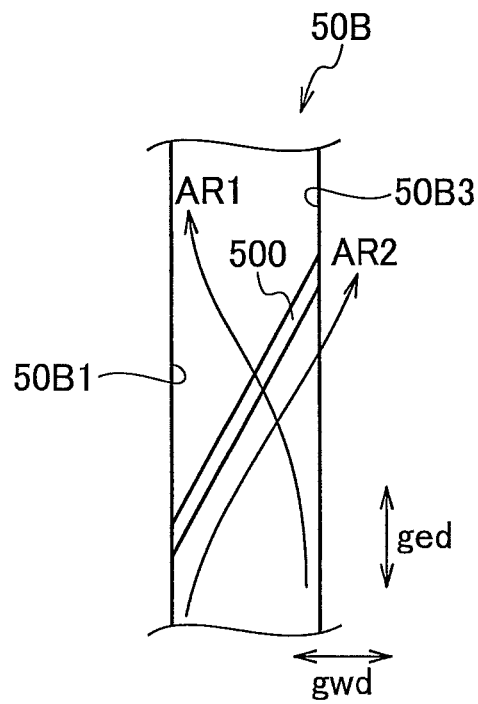
FIG. 10(a) is a view illustrating the circumferential groove 50B in the tread face view.
FIG. 10(b) is a view illustrating the shape of the circumferential groove 50B when viewed from the direction of F5 in FIG. 7.
Figure 10:
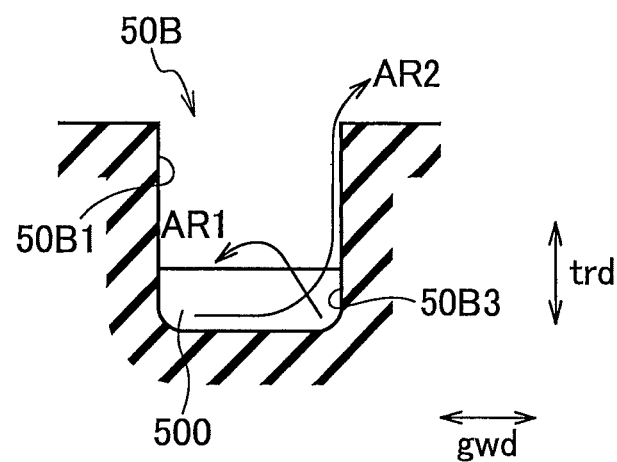

The air flows AR1 and AR2 (relative wind) are generated in the circumferential groove 50B in the opposite direction to the rotation direction tr1 by rotation of the tire 1. As shown in FIG. 10(a) and FIG. 10(b), the air flow AR1 along the side wall 50B3 located on one end side of the projection part 500 which is a downstream side in the air flowing direction is stopped from flowing along the circumferential groove 50B because the projection part 500 stands in the way of the air flow, but therefore proceeds while being inclined to the extending direction ged of the circumferential groove 50B and then climbs over the projection parts 500. As a result, the air flow AR1 changes to a spiral flow (swirling flow). Since the air flow proceeds while involving surrounding air, the flow rate of air increases, and the rate of the air flow AR1 also increases. This facilitates heat dissipation from the tread section 5.

The air flow AR2 along the side wall 50B1 located on another end side of the projection part 500 which is an upstream side in the air flowing direction proceeds in the extending direction x of the projection parts 500. Then, the air flow AR2 flows out of the circumferential groove 50B around the other side wall 50B3 of the circumferential groove 50B. Air that stores heat by passing through the circumferential groove 50B flows to the outside, and thereby promotes heat dissipation from the tread section 5.

Since the projection parts 500 each satisfy the relationship of 0.75L≤P, the number of the projection parts 500 provided on the circumferential groove 50B does not become too large, which inhibits deceleration of air flowing through the circumferential groove 50B. Since the projection parts 500 each satisfy the relationship of P≤10L, the number of the projection parts 500 provided on the circumferential groove 50B does not become too small, and the air flow AR1 efficiently changes to a spiral flow (swirling flow).

Since the relationship of TWf/cos θf≤0.9W is satisfied, the projection width TWf does not become too large. Thus, the air flow AR1 after climbing over the projection parts 500 easily reaches the groove bottom 50B2 of the circumferential groove 50, thereby efficiently dissipating heat from the groove bottom 50B2.

As a result, the tread section 5 is efficiently cooled, which effectively suppresses a temperature rise of the tread section 5 during driving of the vehicle.

Preferably, a relationship of 1.25L<P is satisfied. Through satisfaction of the relation, the number of the projection parts 500 provided on circumferential groove 50B becomes more proper. The area of the groove bottom 50B2, through which the air flow AR passes, does not become too small, efficiently dissipating heat from the groove bottom 50B2.

Preferably, the angle θf that the extending direction x of the projection parts 500 forms with the groove center line WL is 10 degrees to 60 degrees, both inclusive. Since the angle θf is equal to or larger than 10 degrees, the acute angled portions formed by the projection parts 500 and the side wall 50B1 (or side wall 50B3) can inhibit the air flow AR flowing through the circumferential groove 50B from becoming weak. The projection parts 500 can be easily formed on the circumferential groove 50B. Since the angle θf is equal to or smaller than 60 degrees, the air flow AR2 flowing through the circumferential groove 50B can be efficiently changed to a spiral flow. This increases the flow rate passing the groove bottom 50B2, achieving efficient heart dissipation from the tread section 5.

Preferably, a relationship of 0.03D<Hf≤0.4D is satisfied. Satisfying the relationship of 0.03D<Hf, the height Hf of the projection parts 500 is a predetermined height or more, and the projection parts 500 can efficiently change the air flow AR2 flowing through the circumferential groove 50B to a spiral flow. This increases the amount of flow passing the groove bottom 50B2, and achieves efficient heat dissipation from the tread section 5. Satisfying the relationship of Hf≤0.4D makes it more likely to cause the spiral air flow AR1 to reach the groove bottom 50B2. As a result, heat is efficiently dissipated from the groove bottom 50B2.

The groove bottom 50B2 is flat at least over the width of 0.2W. Thus, the air flow AR passing the groove bottom 50B2 is not obstructed, which makes it possible to more effectively suppress a temperature rise in the tread section 5.

Preferably, a relationship of DC/OD≥0.015 is satisfied. In the tire that satisfies the relationship of DC/OD≥0.015, the tread section 5 has a larger rubber gauge and therefore tends to store heat in the tread section 5. For this reason, in the tire that satisfies the relationship of DC/OD≥0.015, effective suppression of a temperature rise in the tread section 5 during driving of the vehicle results in inhibition of any failure due to the temperature rise in the tread section 5. In addition, since the rubber gauge of the tread section 5 is large, the rubber member forming the tread section 5 can be greatly deformed. Thus, in the tire that satisfies the relationship of DC/OD≥0.015, improvement in the durability of the projection parts 500 also results in inhibition of any failure due to a temperature rise of the tread section 5.

The projection parts 500 continuously extend from the one side wall 50B1 to the other side wall 50B3 Accordingly, the air flow AR1 proceeding along the projection parts 500 can climb over the projection parts 500 near the side wall 50B3 and thus efficiently changes to a spiral flow (swirling flow). This can achieve efficient heat dissipation from the tread section 5.

(6) Comparative Evaluation

To confirm the effects of the tire according to the present invention, following measurement was made. The present invention is not limited to a following operating example.

Figure 11:
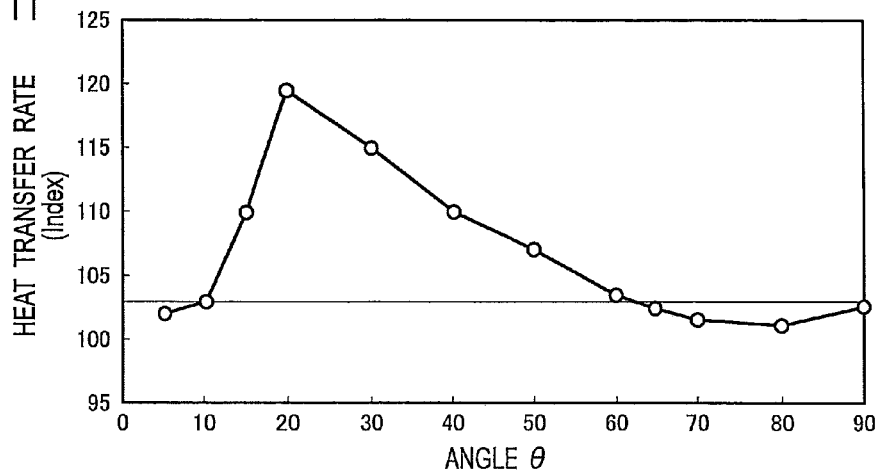
FIG. 11 is a chart illustrating relationship between, an angle $\theta f$ and thermal conductivity of the circumferential groove (represented in index).
Figure 12:
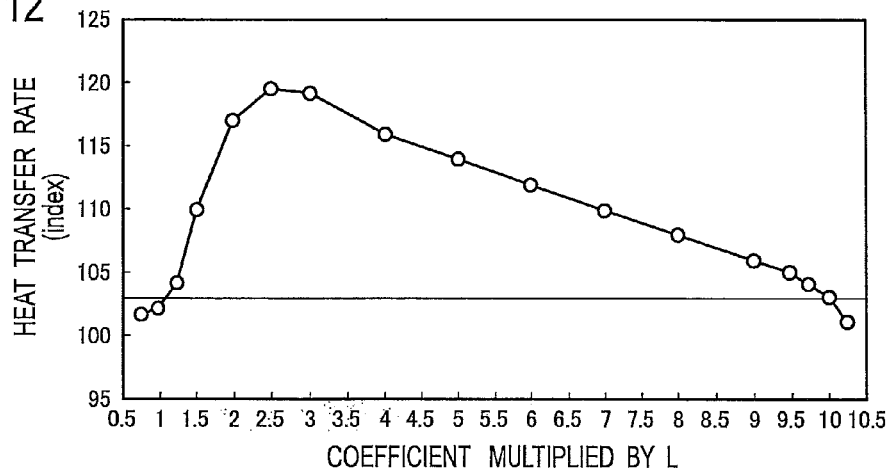
FIG. 12 is a chart illustrating relationship between a coefficient as a multiplier of a length L of the projection parts and the thermal conductivity of the circumferential groove.
Figure 13:
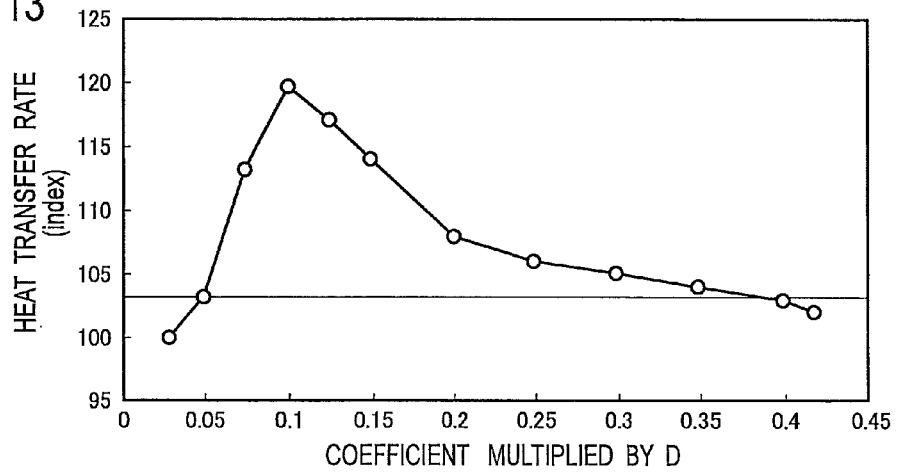
FIG. 13 is a chart illustrating relationship between a coefficient as a multiplier of a groove depth D of the projection parts and the thermal conductivity of the circumferential groove.

A tire (59/80R63) for mine was used as a test tire. Projection parts were provided on a circumferential groove of the tire, and the thermal conductivity at the tire rotational speed of 20 km/h was measured while an angle θf formed by the groove center line and the projection parts, a coefficient as a multiplier of the length L, and a coefficient as a multiplier of the groove depth D were varied. The thermal conductivity in the absence of the projection parts was defined as 100, and was compared with measured thermal conductivity. FIG. 11 to FIG. 13 show results. FIG. 11 shows a relationship between the angle θf and the thermal conductivity of the circumferential groove (represented in index). FIG. 12 shows a relationship between the coefficient as a multiplier of the length L of the projection parts and the thermal conductivity of the circumferential groove. FIG. 13 shows a relationship, between the coefficient as a multiplier of the groove depth D and the thermal conductivity of the circumferential groove.

FIG. 11 demonstrates that the angle θf of 10 degrees to 60 degrees, both inclusive, achieved a favorable thermal conductivity. Especially the angle θf of 15 degrees to 40 degrees, both inclusive, achieved a more favorable thermal conductivity.

FIG. 12 demonstrates that the coefficient as a multiplier of the length L of 0.75 to 10, both inclusive, achieved a favorable thermal conductivity. The coefficient as a multiplier of the length L of 1.25 or more achieved a more favorable thermal conductivity. The coefficient as a multiplier of the length L of 1.5 to 7, both inclusive, achieved a still more favorable thermal conductivity.

FIG. 13 demonstrates that the coefficient as a multiplier of the groove depth D of 0.03 to 0.4, both inclusive, achieved a favorable thermal conductivity.

Next, to check the relationship between the projection width and the thermal conductivity, following measurement was made using the above-mentioned tire.

In all of tires of Operating examples 1 to 4 and Comparative examples 2 to 3, the angle θf was 20 degrees, the length L was 43 mm, the interval P was 86 mm, the projection height Hf was 10 mm, the groove depth D was 100 mm, and the groove width W was 15 mm. The tire in Comparative example 1 had no projection parts.

The tire in Operating example 1 had a projection width TWf of 1.64, TWf/(cos θf·W) of 0.116, and a blockage rate of 11.6%. The tire in Operating example 2 had a projection width TWf of 4.92, TWf/(cos θf·W) of 0.349, and a blockage rate of 34.9%. The tire in Operating example 3 had a projection width TWf of 7.05, TWf/(cos θf·W) of 0.5, and a blockage rate of 50%. The tire in the Operating example 4 had a projection width TWf of 9.87, TWf/(cos θf·W) of 0.7, and a blockage rate of 70%. The tire in Comparative example 2 had a projection width TWf of 12.69, TWf/(cos θf·W) of 0.9, and a blockage rate of 90%. The tire in Comparative example 3 had a projection width TWf of 14.10, TWf/(cos θf·W) of 1, and a blockage rate of 100%.

The thermal conductivity of the tires in the Comparative examples and the Operating examples were measured. Table 1 shows results. Using the thermal conductivity of the tire in Comparative example 1 as a reference (100), the thermal conductivity of the other tires are expressed in index.

TABLE 1

| | Presence of Projections | Projection Width TWf (mm) | TWf (cosθf · W) | Blockage Rate (%) | Thermal Conductivity |
|---|---|---|---|---|---|
| Comparative example 1 | absence | — | — | — | 100 |
| Operating example 1 | presence | 1.64 | 0.116 | 11.6 | 150 |
| Operating example 2 | presence | 4.92 | 0.349 | 34.9 | 145 |
| Operating example 3 | presence | 7.05 | 0.5 | 50 | 135 |
| Operating example 4 | presence | 9.87 | 0.7 | 70 | 116 |
| Comparative example 2 | presence | 12.69 | 0.9 | 90 | 100 |
| Comparative example 3 | presence | 14.1 | 1 | 100 | 78 |

Table 1 shows that when the relationship of TWf/cos θf≤0.9W is satisfied, the thermal conductivity is satisfactory. Therefore, the tire according to the present invention can effectively suppress a temperature rise of the tread section during driving the vehicle.

(7) Other Embodiments

Although the present invention has been described with reference to the embodiment of the present invention, it should not be understood that the description and figures that form a part of this disclosure limit the present invention. The present invention includes various embodiments that are not described herein.

Following embodiments can be appropriately combined with the above-mentioned embodiment so as not to impair effects of the invention.

(7.1) Air Supply Mechanism

Although the air supply mechanism is formed of the tapered face 100R in the above-mentioned embodiment, the air supply mechanism is not limited to the tapered face.

Figure 14:
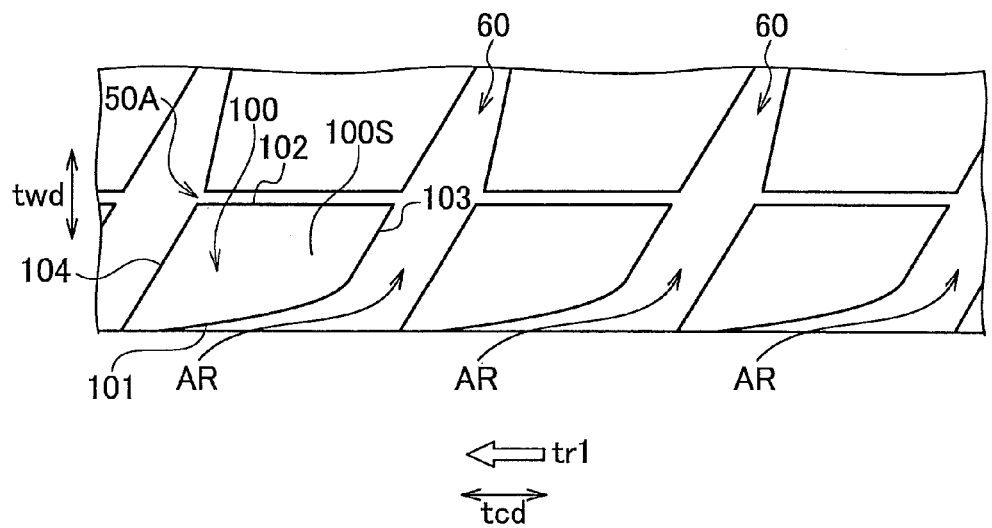
FIG. 14 is a plan view illustrating a circumferential land portion 70A in accordance with another embodiment in the tread face view.
Figure 15:
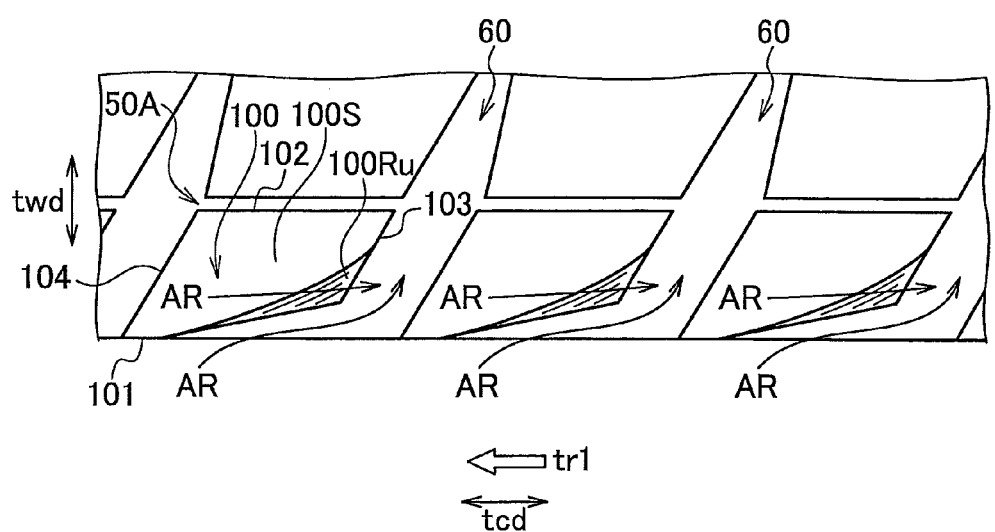
FIG. 15 is a plan view illustrating a circumferential land portion 70A in accordance with another embodiment in the tread face view.

For example, as shown in FIGS. 14 and 15, the length of the land block 100 in the tread width direction twd may become smaller from one side toward the other side in the tire circumferential direction tcd.

FIG. 14 is a plan view illustrating a circumferential land portion 70A in accordance with another embodiment in the tread face view.

A one end 100D of the land block 100 in the tire circumferential direction tcd is located on the rear side in the rotation direction tr1 in which the vehicle to which the tire 1 is attached advances. The other end 100E of the land block 100 in the tire circumferential direction tcd is located on the front side in the rotation direction tr1. A length La1 of the end 100D in the tread width direction is smaller than a length La2 of the end 100E of the land block 100 in the tread width direction. A difference between the length Lb1 and the length La1 is expressed as a length Lw1, and the length Lw1 is preferably 5 mm or more.

The side face 101 extends while being inclined toward the inner side of the land block 100 from the plane along the tire circumferential direction, and extends continuously to the lateral groove face 103 of the land block 100, which forms the inner wall of the lug groove 60. The end 100D of the land block 100 in the tire circumferential direction tcd, which is located on the rear side in the rotation direction, is located inner from the side wall section 7 by the length Lw1 in the tread width direction twd. That is, the rear side of the buttress section 9 in the rotation direction in the tire circumferential direction tcd of the land block 100 is located inner from the side wall section 7 by the length Lw in the tread width direction twd. For this reason, a step is formed between the buttress section 9 and the side face 101. A groove bottom 60b that is the groove bottom of the lug groove 60 extends from the end 100D in the tire circumferential direction tcd, which is located on the rear side in the rotation direction, toward the end 100E. The groove bottom 60b is located between the buttress section 9 and the side face 101.

As shown in FIG. 14, when the tire 1 rotates in the rotation direction tr1, an air flow (relative wind) AR generated by the rotation of the tire 1 flows along the side face 101 of the land block 100 in the direction opposite to the rotation direction tr1. The air flow AR flowing along the side face 101 hits against the lateral groove face 104 of the land block 100 located behind in the rotation direction tr1, and is guided to the lug groove 60. As a result, air around the tire 1 is taken into the lug groove 60 to increase the flow rate of air flowing in the lug groove 60. This can improve the thermal conductivity of the lug groove 60, lowering the temperature of the tread section 5.

FIG. 15 is a plan view illustrating the circumferential land portion 70A in accordance with another embodiment in the tread face view. A curved round face 100 Ru is formed at a vertex of the tread face 100S of the tread section 5 to come into contact with the road surface, the side face 101, and the lateral groove face 103, in the land block 100 of the tire 1. That is, the tread face 100S, the side face 101, and the lateral groove face 103 are chamfered. As shown in FIG. 15, an area of the tread face 100S of the tread section 5 to come into contact with the road surface in the land block 100 of the tire 1 is smaller than an area of the land block 100 continuous to the groove bottom 60b of the lug groove 60. The land block 100 gradually becomes larger from the tread face 100S to come into contact with the road surface toward a connecting portion thereof with the groove bottom 60b.

Figure 16:
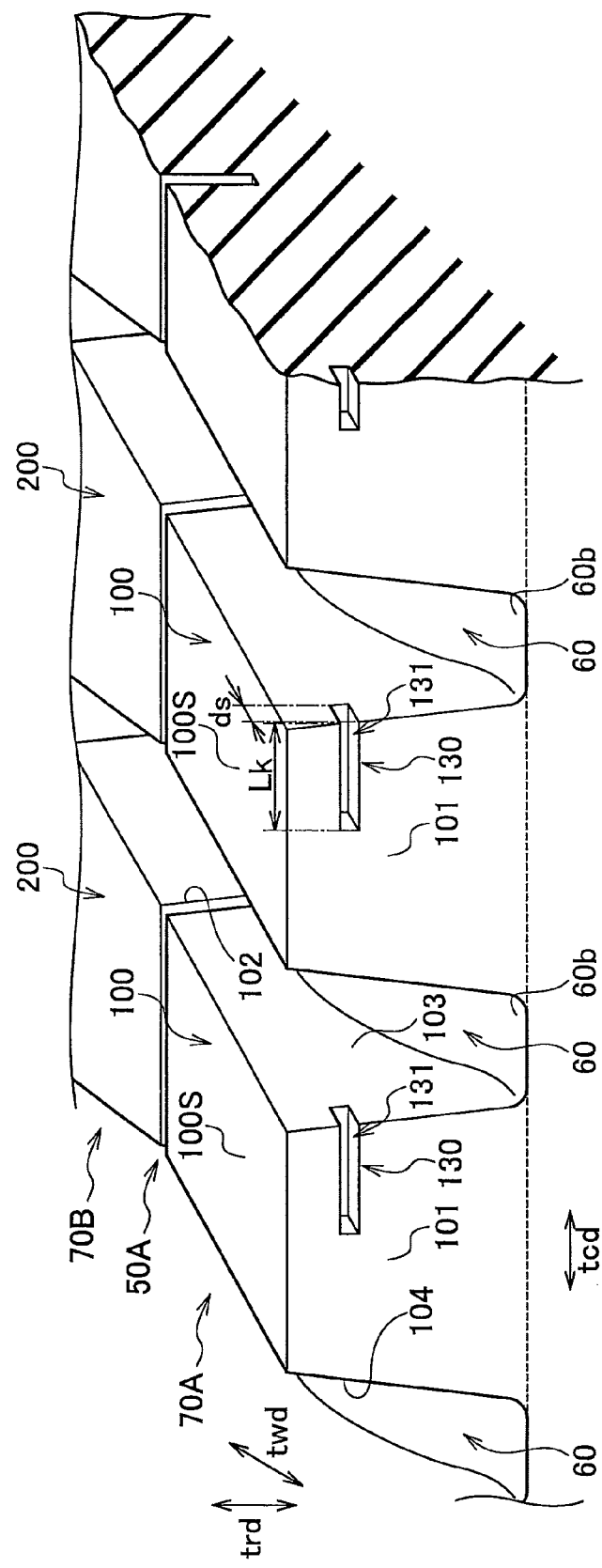
FIG. 16 is an enlarged perspective view illustrating a tread section 5 in accordance with another embodiment.
Figure 17:
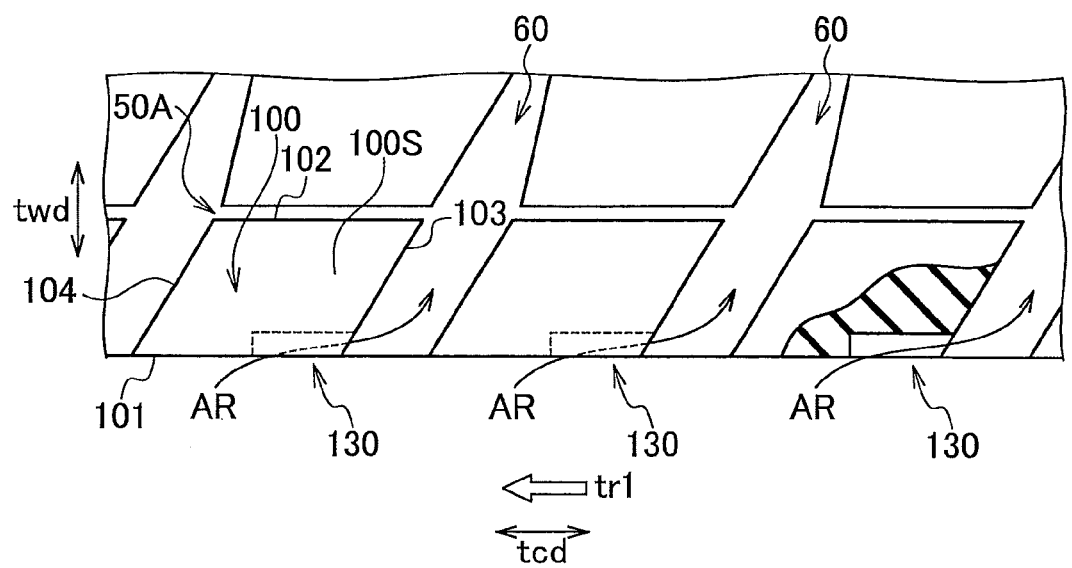
FIG. 17 is a plan view illustrating a circumferential land portion 70A in accordance with another embodiment in the tread face view.

As shown in FIG. 16 and FIG. 17, the side face 101 of the land block 100 may have a notched part 130 that is cut out inward of the land block 100 from the side face 101, and communicates with at least one side of the lug groove 60.

FIG. 16 is an enlarged perspective view of a tread section 5 in accordance with another embodiment. FIG. 17 is a plan view of a circumferential land portion 70A in accordance with another embodiment in the tread face view.

The notched part 130 is formed in the buttress section 9 that is the side face of the land block 100, which crosses in the tread width direction twd. The notched part 130 is formed outer from a line connecting the groove bottoms 60b of the lug grooves 60 in front of and behind the land block 100 in the tire circumferential direction tcd to each other in the tire radial direction trd.

The notched part 130 is formed at one end of the side face 101 of the land block 100 in the tire circumferential direction tcd. The notched part 130 is notched inward from the side face 101 of the land block 100 (in the tread width direction twd), and communicates with the lug groove 60 in the tire circumferential direction tcd. The side face 101 of the block 100 and the lateral groove face 103 have an opening 131.

A length Lk of the notched part 130 in the tire circumferential direction is smaller than a length WB of the land block 100 in the tire circumferential direction tcd.

The depth ds of the notched part 130 from the side face 101 of the land block 100 in the tread width direction twd is constant along the tire circumferential direction tcd of the land block 100. The opening 131 of the notched part 130, which is formed in the side face 101 of the land block 100, is rectangular when viewed in the tread width direction twd. The notched part 130 is formed in the surface of the tread section 5 in parallel.

As shown in FIG. 17, when the tire 1 rotates in the rotation direction tr1, an air flow (relative wind) AR generated by the rotation of the tire 1 flows into the notched part 130, and flows along the notched part 130 in the direction opposite to the rotation direction tr1. The air flow AR flowing along the notched part 130 hits against the lateral groove face 104 of the land block 100 located behind in the rotation direction tr1, and is guided to the lug grooves 60. As a result, air around the tire 1 is taken into the lug grooves 60 to increase the flow rate of air flowing in the lug grooves 60. This can improve the thermal conductivity of the lug grooves 60, lowering the temperature of the tread section 5.

A depth ds of the notched part 130 may become larger as the notched part 130 gets closer to the lug groove 60 with which the notched part 130 communicates.

Figure 18:
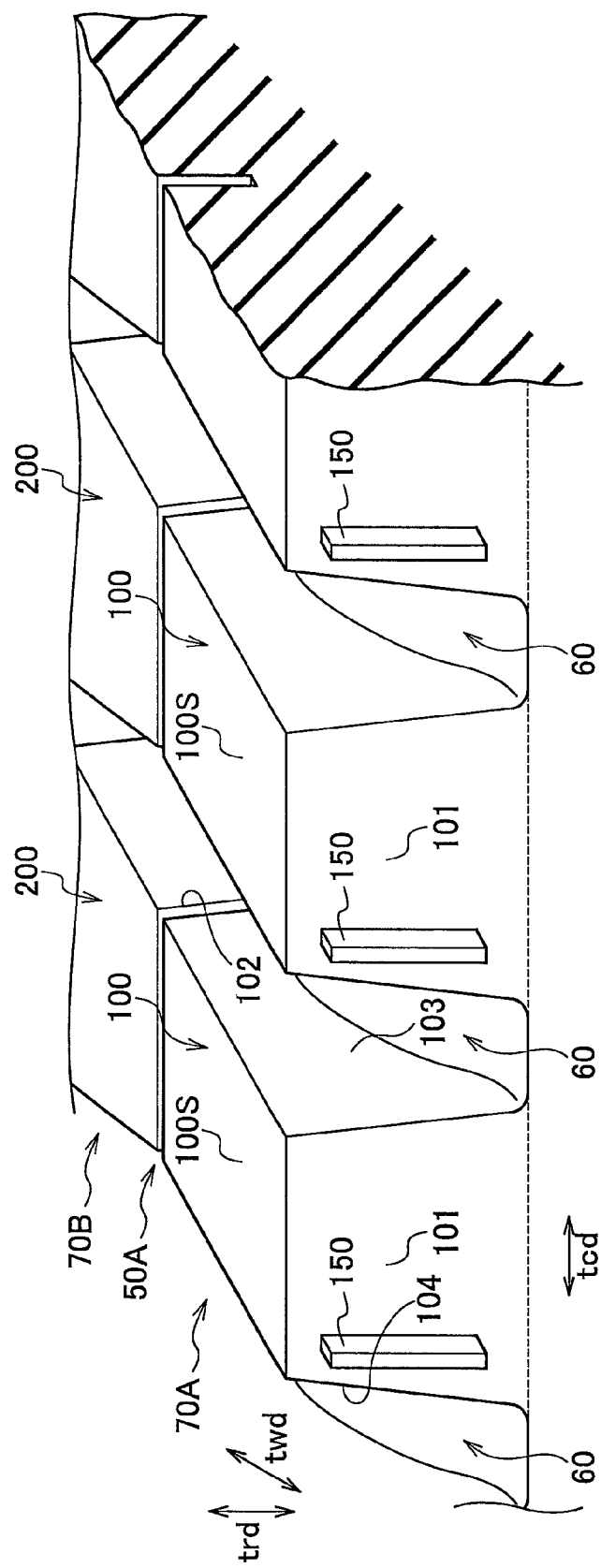
FIG. 18 is an enlarged perspective view illustrating a tread section 5 in accordance with another embodiment.
Figure 19:
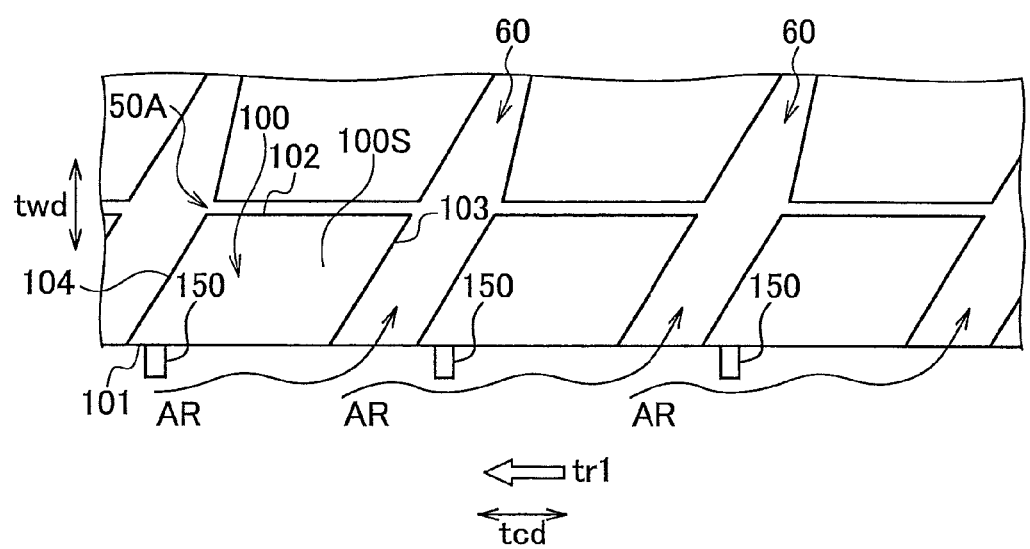
FIG. 19 is a plan view illustrating a circumferential land portion 70A in accordance with another embodiment in the tread face view.

As shown in FIG. 18 and FIG. 19, the side face 101 of the land block 100 may have a protruding part 150 protruding in the tread width direction twd.

FIG. 18 is an enlarged perspective view illustrating a tread section 5 in accordance with another embodiment. FIG. 19 is a plan view illustrating a circumferential land portion 70A in accordance with another embodiment in the tread face view.

The protruding part 150 is formed near the lug groove 60 located on one side of the side face 101 of the land block 100 in the tire circumferential direction tcd. The other side of the side face 101 of the land block 100 in the tire circumferential direction tcd is substantially smooth. Substantially smooth described herein allows minute irregularities due to manufacturing deviation. The minute irregularities are, for example, irregularities within 10% of the length of the land block 100 in the tread width direction twd.

A length Lr of the protruding part 150 in the tire circumferential direction tcd is smaller than the length WB of the land block 100 formed in the circumferential land portion 70A in the tire circumferential direction tcd.

The protruding part 150 is a rectangle linearly extending in the tire radial direction trd, and the tire radial direction trd may be inclined to the longitudinal direction of the rectangle. In this case, an angle that the center line of the protruding part 150, which is set at the center portion in the tire circumferential direction tcd, forms with the tire normal line (that is, tire radial direction trd) may be $|\gamma| \le 60°$. The protruding part 150 shown in FIG. 18 and FIG. 19 is arranged such that the tire radial direction trd matches the longitudinal direction of the rectangle and the tread width direction twd matches the lateral direction of the rectangle.

The multiple protruding parts 150 may be formed on the side face 101 of the land block 100. The multiple protruding parts 150 may be linearly arranged along the tire radial direction trd.

The multiple protruding parts 150 may be inclined to the tire radial direction trd when viewed in the tread width direction twd.

The protruding parts 150 are not necessarily rectangular. The cross section of the protruding part 150, which is perpendicular to the longitudinal direction, may be triangular. The cross section of the protruding part 150, which is perpendicular to the longitudinal direction, may be shaped like a trapezoid having a bottom attached to the side face 101 of the land block 100 as a long side. The cross section of the protruding part 150 which is perpendicular to the longitudinal direction, may be shaped like a trapezoid having a bottom attached to the side face 101 of the land block 100 as a short side. The cross section of the protruding part 150, which is perpendicular to the longitudinal direction, may be inclined toward one side in the rotation direction. The protruding part 150 may be a parallelogram when viewed in the direction along the tire rotary axis. The protruding part 150 may be formed such that a width of the central portion in the longitudinal direction is smaller than a width at an end in the longitudinal direction when viewed in the direction along the tire rotary axis. The protruding part 150 may be elliptical when viewed in the direction along the tire rotary axis. Other shapes that can disturb air passing the surface of the tire are available.

In the above-mentioned embodiment, both land blocks 100 in the tread width direction twd have the respective air supply mechanisms and however, the present invention is not limited to this. Only one land block 100 in the tread width direction twd may have the air supply mechanism. The different land blocks 100 may have air supply mechanisms of different shapes.

(7.2) Projection Parts

In the above-mentioned embodiment, the projection parts 500 are flat plate-shaped and however, may take other shapes. The projection parts 500 may have a wave form shape in the tread face view, or may have a shape that is thick near the groove center line WL and becomes thinner toward the side wall 50B1 and the side wall 50B3 (or vice versa), for example.

Figure 20:
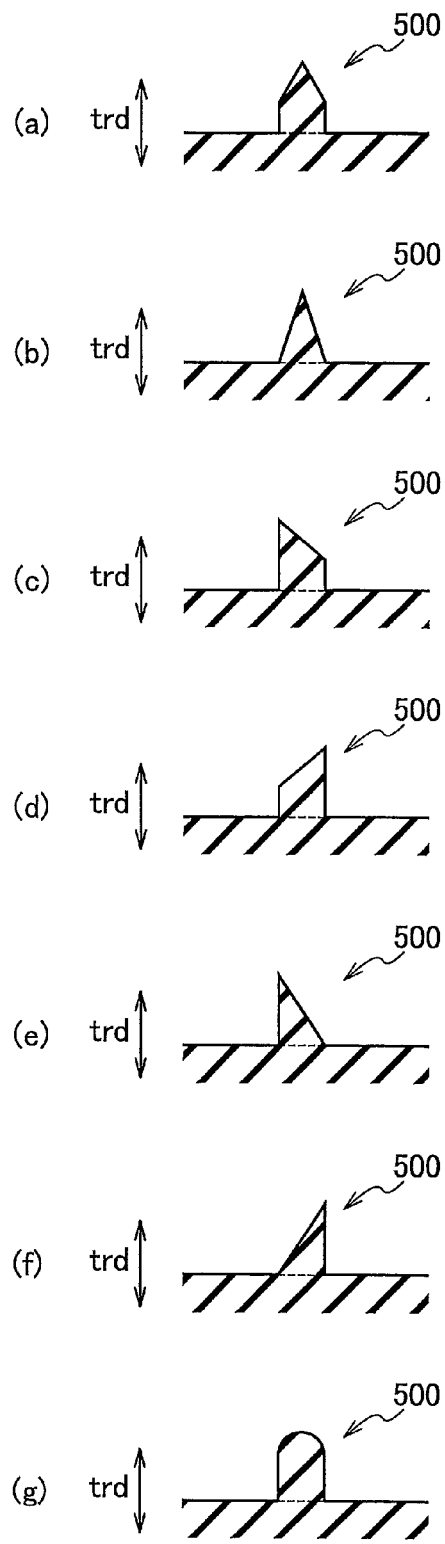
FIG. 20(a) to FIG. 20(g) are views illustrating modification examples of the sectional shape of a projection part 500.

FIGS. 20(*a*) to 20(*g*) are views illustrating modification examples of the sectional shape of the projection part 500. As shown in FIGS. 20(*a*) to 20(*g*), in the sectional shape of the projection part 500 (as shown in FIG. 9), the upper end is not necessarily flat. In the sectional shape of the projection part 500, the upper end may be inclined or arcuate.

The angle θf, the groove depth D, and the groove width W may fail to satisfy the conditions determined in the above-mentioned embodiment.

The projection parts 500 are provided on only the circumferential groove 50B and however, may be provided on other places. The projection parts 500 may be formed in the circumferential groove 50C formed in an area including the tire center line CL, or may be provided on the circumferential groove 50C.

(7.3) Others

Although the circumferential groove 50B extends parallel to the tire circumferential direction tcd in the above-mentioned embodiment, the present invention is not limited to this. The circumferential groove 50B is not necessarily parallel to the tire circumferential direction tcd. For example, the circumferential groove 50B may not be parallel to the tire circumferential direction tcd as long as an angle that the circumferential groove 50B forms with the tire center line CL is 45 degrees or less. The circumferential groove 50B is not necessarily linear, and may be curved outward in the tread width direction twd or take a zigzag pattern. Preferably, the circumferential groove 50B takes the zigzag pattern so as not to lower the rate of air flowing through the circumferential groove 50B.

In the above-mentioned embodiment, the circumferential groove 50B is formed such that the length DL from the belt end 30*e* to the groove center line WL in the tread width direction twd is 200 mm or less and however, the present invention is not limited to this. The circumferential groove SOB may be formed such that the length DL is larger than 200 mm.

The lug grooves 60 may extend to the circumferential groove 50C, and the groove bottoms of the circumferential grooves 50 may have the projection parts 500. That is, the circumferential grooves provided with the projection parts 500 may be formed in an area including the tire center line CL. This can decrease the temperature of the tread section 5.

All the lug grooves 60 are formed at the same angle to the tire circumferential direction tcd, but may be formed at different angles. In one tire, the inclined angles φ of the lug grooves 60 are not necessarily the same. The inclined angle φ of the lug groove 60 may vary between the lug groove 60 located near one end in the tread width direction twd and the lug groove 60 located near the other end in the tread width direction twd. In addition, the inclined angles φ may vary among the lug grooves 60 located near one end in the tread width direction twd.

The tire 1 according to this embodiment is extremely suitable for so-called extra-large tires, but may be applied to general tires.

The tire according to the present invention may be a pneumatic tire or a solid tire filled with rubber. Alternatively, the tire may be a tire filled with a gas other than air with a rare gas such as Argon, a nitrogen or the like.

As described above, the present invention includes various embodiments that are not described herein. Therefore, the technical scope of the present invention is determined based on only subject matters in CLAIMS that properly derived from the above description.

Note that the entire content of Japanese Patent Application No. 2012-150928 (filed on Jul. 4, 2012) are incorporated herein by reference.

INDUSTRIAL APPLICABILITY

As described above, the tire according the present invention can effectively suppress a temperature rise of the tread section during driving of the vehicle, which is advantageous especially in the heavy-loading tire.

The invention claimed is:

1. A tire comprising:
a tread section with a groove portion formed to extend in a tire circumferential direction; and
a plurality of projection parts provided on a groove bottom of the groove portion, wherein
each of the projection parts extends from one of side walls forming the groove portion to the other side wall opposed to the one side wall,
the one of side walls is provided with a recess portion guiding air flow flowing through a lateral groove portion to one direction of a tire circumferential direction,
the recess portion is triangular in a tread face view of the tire and is located at a location opposed to the lateral groove portion having an opening at the groove portion,
a vertex of the recess portion is located on a position which is located in an extending direction of the lateral groove portion and displaced from a center line of the lateral groove portion passing a center in a direction orthogonal to the extending direction of the lateral groove portion,
the projection parts are arranged at predetermined intervals in the groove portion,
a relationship of $0.75L \leq P \leq 10L$ is satisfied in the tread face view of the tire where L denotes a length of the projection parts along a groove center line passing a widthwise center of the groove portion, and P denotes the predetermined intervals, and
a relationship of $TWf/\cos\theta f \leq 0.9W$ is satisfied in the tread face view of the tire where W denotes a groove width of the groove portion, TWf denotes a width of the projection parts in a direction orthogonal to an extending direction of the projection parts, and θf denotes an angle formed by the extending direction of the projection parts and the groove center line in a direction opposite to a rotation direction of the tire.

2. The tire according to claim 1, wherein the angle θf is 10 degrees to 60 degrees, both inclusive.

3. The tire according to claim 1, wherein
a relationship of $0.03D < Hf \leq 0.4D$ is satisfied, where Hf denotes a height of the projection parts from the groove bottom, and D denotes a depth of the groove portion from the tread face to the groove bottom.

4. The tire according to claim 1, wherein
a relationship of $DC/OD \geq 0.015$ is satisfied, where OD denotes a tire outer diameter, and DC denotes a rubber gauge of the tread section at a position on a tire center line.

5. The tire according to claim 1, wherein the projection parts continuously extend from the one side wall to the other side wall.

6. The tire according to claim 1, wherein
a central portion of the groove bottom including the groove center line in the groove width has no irregularity, and the surface of the groove bottom is flat and smooth, and
a cross section of the groove portion along a tire radial direction and a tread width direction is rectangular.

* * * * *